(12) United States Patent
Byun

(10) Patent No.: US 11,216,363 B2
(45) Date of Patent: Jan. 4, 2022

(54) CONTROLLER TO CONTROL SEMICONDUCTOR MEMORY DEVICE TO PERFORM GARBAGE COLLECTION OPERATION AND METHOD OF OPERATING THE SAME

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/706,214

(22) Filed: Dec. 6, 2019

(65) Prior Publication Data

US 2021/0042221 A1    Feb. 11, 2021

(30) Foreign Application Priority Data

Aug. 6, 2019    (KR) .................... 10-2019-0095702

(51) Int. Cl.
*G06F 12/02*    (2006.01)

(52) U.S. Cl.
CPC .. *G06F 12/0246* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 8,316,176 | B1 * | 11/2012 | Phan | G06F 12/0246 711/103 |
| 10,739,996 | B1 * | 8/2020 | Ebsen | G06F 3/064 |
| 2015/0178194 | A1 * | 6/2015 | Shaharabany | G06F 12/0253 711/171 |

FOREIGN PATENT DOCUMENTS

| | | |
|---|---|---|
| KR | 10-2009-0116505 | 11/2009 |
| KR | 10-2018-0079584 | 7/2018 |

* cited by examiner

*Primary Examiner* — Kevin Verbrugge
(74) *Attorney, Agent, or Firm* — IP & T Group LLP

(57) ABSTRACT

A method of operating a controller configured to control a semiconductor memory device including a plurality of memory blocks may include selecting victim blocks that are targets for garbage collection among the plurality of memory blocks; determining whether data stored in valid pages included in each of the victim blocks includes sequential data; and performing a garbage collection operation on the victim blocks based on whether the data stored in the valid pages included in the each of victim blocks include sequential data.

14 Claims, 16 Drawing Sheets

CONTROLLER TO CONTROL SEMICONDUCTOR MEMORY DEVICE TO PERFORM GARBAGE COLLECTION OPERATION AND METHOD OF OPERATING THE SAME

CROSS-REFERENCE TO RELATED APPLICATION

The present application claims priority under 35 U.S.C. § 119(a) to Korean patent application number 10-2019-0095702, filed on Aug. 6, 2019, which is incorporated herein by reference in its entirety.

BACKGROUND

1. Field of Invention

Various embodiments of the present disclosure generally relate to an electronic device, and more particularly, to a controller of a semiconductor memory device and a method of operating the controller.

2. Description of Related Art

Generally, a semiconductor memory device may have a two-dimensional structure in which strings are horizontally arranged on a semiconductor substrate, or a three-dimensional structure in which strings are vertically stacked on a semiconductor substrate. The three-dimensional semiconductor memory device may be a device which is devised to overcome a limitation in the degree of integration of the two-dimensional semiconductor memory device, and may include a plurality of memory cells which are vertically stacked on a semiconductor substrate. A controller may control the operation of the semiconductor memory device.

SUMMARY

Various embodiments of the present disclosure are directed to a controller capable of enhancing a read speed of a semiconductor memory device and a method of operating the controller.

An embodiment of the present disclosure may provide for a controller configured to control an operation of a semiconductor memory device including a plurality of memory blocks. The controller may include: a victim block determiner, a sequential data determiner, an associated data determiner, and a garbage collection performer. The victim block determiner may select a victim block for garbage collection among the plurality of memory blocks. The sequential data determiner may determine whether data stored in valid pages included in the victim block includes sequential data. The associated data determiner may determine, when the data stored in the valid pages included in the victim block may be determined as including the sequential data, associated data for forming sequential data together with the data stored in the valid pages included in the victim block. The associated data may be stored in a memory block different from the victim block among the plurality of memory blocks. The garbage collection performer may control the semiconductor memory device to perform a garbage collection operation based on the data stored in the valid pages of the victim block and the associated data.

An embodiment of the present disclosure may provide for a method of operating a controller configured to control a semiconductor memory device including a plurality of memory blocks. The method may include: selecting victim blocks that are targets for garbage collection among the plurality of memory blocks; determining whether data stored in valid pages included in each of the victim blocks includes sequential data; and performing a garbage collection operation on the victim blocks based on whether the data stored in the valid pages included in each of the victim blocks includes sequential data.

An embodiment of the present disclosure may provide for a memory system including a memory device and a controller. The memory device may include plural memory blocks. The controller may be configured to control the memory device to move first and second parts of valid data, which are respectively stored in first and second ones among the memory blocks, into a target block during a garbage collection operation on the first memory block. The first and second parts may together configure sequential data.

BRIEF DESCRIPTION OF THE DRAWINGS

Various embodiments are described more fully below with reference to the accompanying drawings; however, the present invention may be embodied in different forms and should not be construed as limited to the embodiments set forth herein. Rather, these embodiments are provided so that this disclosure is thorough and complete and fully convey the scope of the embodiments to those skilled in the art.

In the drawing figures, dimensions may be exaggerated for clarity of illustration. Like reference numerals refer to like elements throughout. Throughout the specification, reference to "an embodiment," "another embodiment" or the like is not necessarily to only one embodiment, and different references to any such phrase are not necessarily to the same embodiment(s).

DETAILED DESCRIPTION

Figure 1:
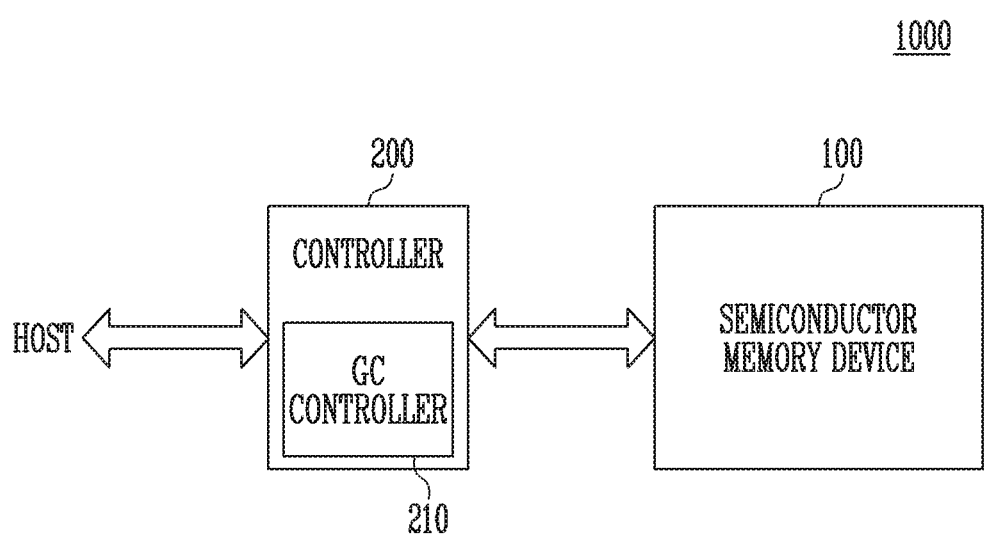
FIG. 1 is a block diagram illustrating an example of a memory system.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that the present disclosure will be thorough and complete, and will fully convey the technical spirit of the disclosure to those skilled in the art.

While terms such as "first" and "second" may be used to identify various components, such components are not limited to or by the above terms. The above terms are used only to distinguish one component from another. For example, a first component in one instance may be referred to as a second component in another instance without implying any substantive change in the component itself.

It will be understood that when an element is referred to as being "coupled" or "connected" to another element, it can be directly coupled or connected to the other element or intervening elements may be present therebtween. In the specification, when an element is referred to as "comprising" or "including" a component, it does not preclude another component but may further include other components unless the context clearly indicates otherwise. Moreover, when an element is referred to as being "between" two elements, such element may be the only element between the two elements or one or more intervening elements may be present.

The terms used in the present application are merely used to describe particular embodiments, and are not intended to limit the present disclosure. Singular forms in the present disclosure are intended to include the plural forms as well, unless the context clearly indicates otherwise.

Hereinafter, embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure.

FIG. 1 is a block diagram illustrating an example of a memory system.

Referring FIG. 1, a memory system 1000 may include a semiconductor memory device 100 and a controller 200.

The semiconductor memory device 100 may operate under control of the controller 200. In detail, the semiconductor memory device 100 may write data to the memory cell array 110 in response to a write request from the controller 200. If a write command, an address, and data are received in response to a write request from the controller 200, the semiconductor memory device 100 may write data to memory cells indicated by the address.

In response to a read request from the controller 200, the semiconductor memory device 100 may perform a read operation. When a read command and an address are received in response to a read request from the controller 200, the semiconductor memory device 100 may read data from memory cells indicated by the address and output the read data to the controller 200.

The semiconductor memory device 100 may be implemented as many alternate forms, such as a NAND flash memory, a vertical NAND flash memory (hereinafter, referred to as 'VNAND flash memory'), a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM). In addition, the semiconductor memory device 100 according to the present disclosure may be implemented as a three-dimensional array structure. The present disclosure may be applied not only to a flash memory in which a charge storage layer is formed of a conductive floating gate, but also to a charge trap flash (CTF) memory in which a charge storage layer is formed of an insulating layer.

The controller 200 is coupled between the semiconductor memory device 100 and a host. The controller 200 may interface the host 300 and the semiconductor memory device 100. The controller 200 may transmit a write request or a read request to the semiconductor memory device 100 under control of the host.

The controller 200 may include a garbage collection controller (210; hereinafter, referred to as "GC controller"). The GC controller 210 may control a garbage collection operation for the semiconductor memory device 100.

In the controller 200 in accordance with an embodiment of the present disclosure, when it is determined that valid data included in a victim block includes at least a portion of sequential data, the GC controller 210 may control the semiconductor memory device 100 to perform a garbage collection operation using the valid data of the victim block and associated data of a normal memory block that is not included in the victim block. Hence, sequential characteristics of data may be enhanced. Consequently, the read speed of the semiconductor memory device 100 may be enhanced.

Detailed configuration and operation of the GC controller 210 included in the controller 200 in accordance with an embodiment of the present disclosure will be described later with reference to FIGS. 7 to 15.

Figure 2:
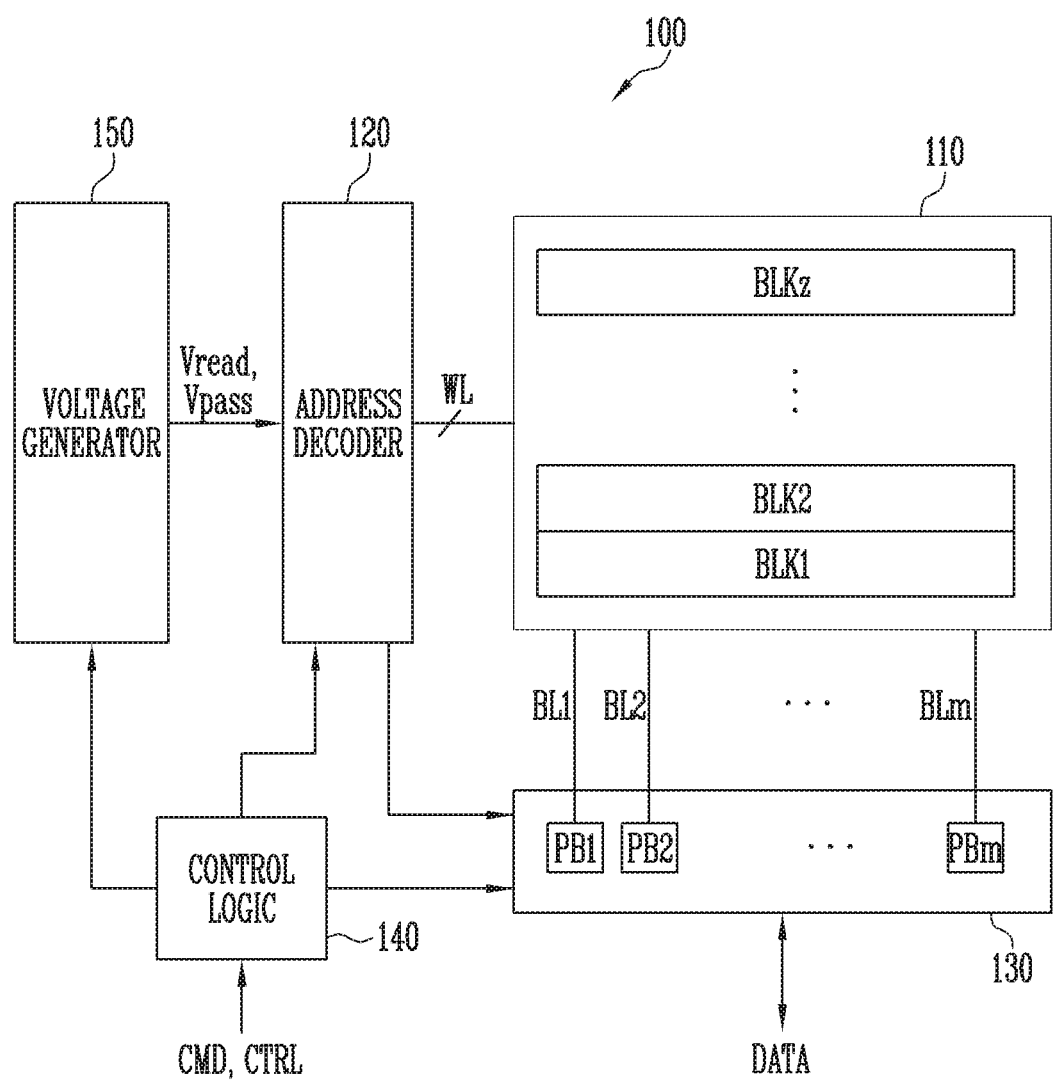
FIG. 2 is a block diagram illustrating a semiconductor memory device of FIG. 1.

FIG. 2 is a block diagram illustrating the semiconductor memory device 100 of FIG. 1.

Referring to FIG. 2, the semiconductor memory device 100 includes a memory cell array 110, an address decoder 120, a read/write circuit 130, a control logic 140, and a voltage generator 150.

The memory cell array 110 includes a plurality of memory blocks BLK1 to BLKz. The memory blocks BLK1 to BLKz are coupled to the address decoder 120 through word lines WL. The memory blocks BLK1 to BLKz are coupled to the read/write circuit 130 through bit lines BL1 to BLm. Each of the memory blocks BLK1 to BLKz includes a plurality of memory cells. In an embodiment, the memory cells may be nonvolatile memory cells and be formed of nonvolatile memory cells having a vertical channel structure. The memory cell array 110 may be formed of a memory cell array having a two-dimensional structure. In an embodiment, the memory cell array 110 may be formed of a memory cell array having a three-dimensional structure. Each of the memory cells included in the memory cell array may store at least one bit of data. In an embodiment, each of the memory cells included in the memory cell array 110 may be a single-level cell (SLC), which may store 1-bit data. In an embodiment, each of the memory cells included in the memory cell array 110 may be a multi-level cell (MLC), which may store 2-bit data. In an embodiment, each of the memory cells included in the memory cell array 110 may be a triple-level cell (TLC), which may store 3-bit data. In an embodiment, each of the memory cells included in the memory cell array 110 may be a quad-level cell (QLC), which stores 4-bit data. In various embodiments, the memory cell array 110 may include a plurality of memory cells each of which stores 5 or more bits of data.

The address decoder 120, the read/write circuit 130, the control logic 140, and the voltage generator 150 are operated as peripheral circuits for driving the memory cell array 110. The address decoder 120 is coupled to the memory cell array 110 through the word lines WL. The address decoder 120 may operate under control of the control logic 140. The address decoder 120 may receive addresses through an input/output buffer (not illustrated) provided in the semiconductor memory device 100.

The address decoder 120 may decode a block address among the received addresses. The address decoder 120 may select at least one memory block based on the decoded block address. When a read voltage application operation is performed during a read operation, the address decoder 120 may apply a read voltage Vread generated from the voltage generator 150, to a selected word line of a selected memory block and apply a pass voltage Vpass to the other unselected word lines. During a program verify operation, the address decoder 120 may apply a verify voltage generated from the voltage generator 150, to a selected word line of a selected memory block, and apply a pass voltage Vpass to the other unselected word lines.

The address decoder 120 may decode a column address among the received addresses. The address decoder 120 may transmit the decoded column address to the read/write circuit 130.

The read or program operation of the semiconductor memory device 100 is performed on a page basis. Addresses received in response to a request for a read or program operation may include a block address, a row address and a column address. The address decoder 120 may select one memory block and one word line based on the block address and the row address. The column address may be decoded by the address decoder 120 and provided to the read/write circuit 130.

The address decoder 120 may include a block decoder, a row decoder, a column decoder, an address buffer, etc.

The read/write circuit 130 includes a plurality of page buffers PB1 to PBm. The read/write circuit 130 may be operated as a read circuit during a read operation of the memory cell array 110 and as a write circuit during a write operation. The page buffers PB1 to PBm are coupled to the memory cell array 110 through the bit lines BL1 to BLm. During a read operation or a program verify operation, to sense threshold voltages of the memory cells, the page buffers PB1 to PBm may continuously supply sensing current to the bit lines coupled to the memory cells, and each page buffer may sense, through a sensing node, a change in the amount of flowing current depending on a programmed state of a corresponding memory cell, and latch the change as sensing data. The read/write circuit 130 is operated in response to page buffer control signals outputted from the control logic 140.

During a read operation, the read/write circuit 130 may sense data of the memory cells and temporarily store read-out data, and then output data DATA to the input/output buffer (not illustrated) of the semiconductor memory device 100. In an embodiment, the read/write circuit 130 may include a column select circuit or the like as well as the page buffers (or page registers).

The control logic 140 is coupled to the address decoder 120, the read/write circuit 130, and the voltage generator 150. The control logic 140 may receive a command CMD and a control signal CTRL through the input/output buffer (not illustrated) of the semiconductor memory device 100. The control logic 140 may control the overall operation of the semiconductor memory device 100 in response to the control signal CTRL. The control logic 140 may output a control signal for controlling the sensing node precharge potential levels of the plurality of page buffers PB1 to PBm. The control logic 140 may control the read/write circuit 130 to perform a read operation of the memory cell array 110.

The voltage generator 150 may generate a read voltage Vread and a pass voltage Vpass during a read operation in response to a control signal output from the control logic 140. The voltage generator 150 may include, so as to generate a plurality of voltages having various voltage levels, a plurality of pumping capacitors configured to receive an internal supply voltage, and may generate a plurality of voltages by selectively enabling the plurality of pumping capacitors under control of the control logic 140.

The address decoder 120, the read/write circuit 130, and the voltage generator 150 may function as peripheral circuits for performing a read operation, a write operation, or an erase operation on the memory cell array 110. The peripheral circuits may perform a read operation, a write operation, or an erase operation on the memory cell array 110 under control of the control logic 140.

Figure 3:
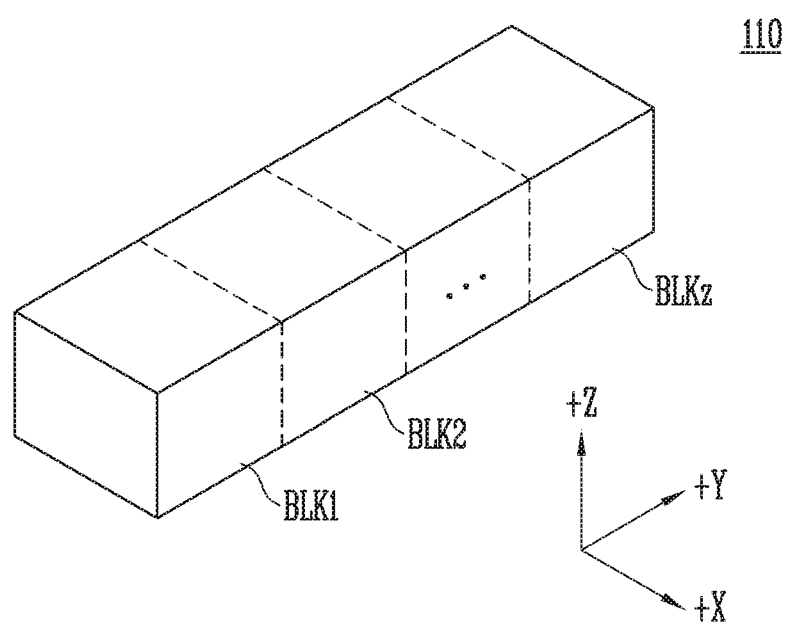
FIG. 3 is a diagram illustrating an embodiment of a memory cell array of FIG. 2.

FIG. 3 is a diagram illustrating an embodiment of the memory cell array 110 of FIG. 2.

Referring to FIG. 3, the memory cell array 110 may include a plurality of memory blocks BLK1 to BLKz. Each memory block may have a three-dimensional structure. Each memory block may include a plurality of memory cells stacked on a substrate. The memory cells are arranged in a +X direction, a +Y direction, and a +Z direction. The structure of each memory block will be described in more detail with reference to FIGS. 4 and 5.

Figure 4:
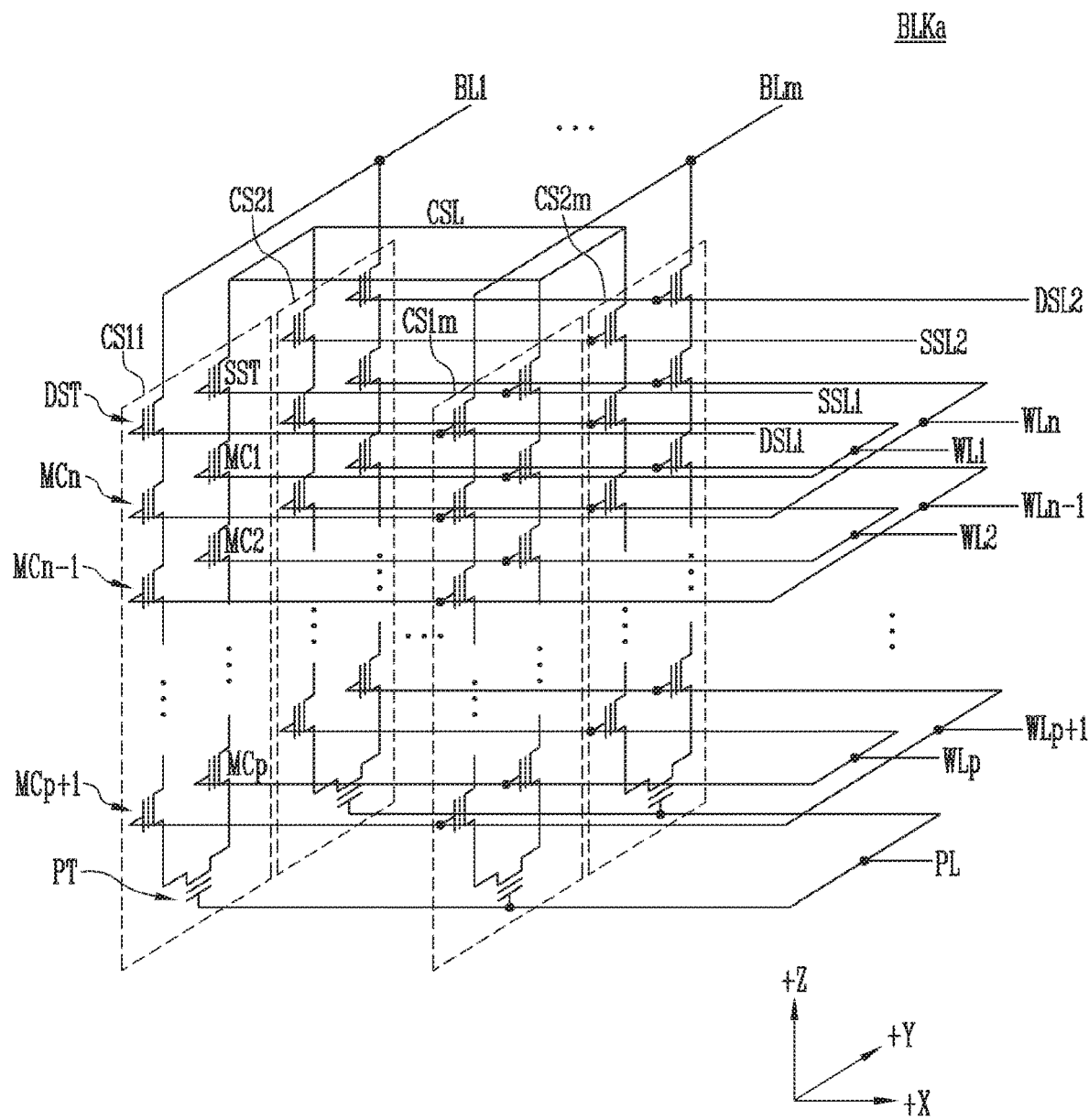
FIG. 4 is a circuit diagram illustrating any one memory block BLKa of memory blocks BLK1 to BLKz of FIG. 2, in accordance with an embodiment of the present disclosure.

FIG. 4 is a circuit diagram illustrating any one memory block BLKa of memory blocks BLK1 to BLKz of FIG. 2, in accordance with an embodiment of the present disclosure.

Referring to FIG. 4, the memory block BLKa may include a plurality of cell strings CS11 to CS1m and CS21 to CS2m. In an embodiment, each of the cell strings CS11 to CS1m and CS21 to CS2m may be formed in a 'U' shape. In the memory block BLKa, m cell strings may be arranged in a row direction (i.e., the +X direction). In FIG. 4, two cell strings are illustrated as being arranged in a column direction (i.e., the +Y direction). However, this illustration is made only for convenience of description, and it will be understood that three or more cell strings may be arranged in the column direction.

Each of the plurality of cell strings CS11 to CS1m and CS21 to CS2m may include at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 4, source select transistors of the cell strings CS11 to CS1m in a first row are coupled to a first source select line SSL1. Source select transistors of the cell strings CS21 to CS2m in a second row are coupled to a second source select line SSL2.

In an embodiment, the source select transistors of the cell strings CS11 to CS1m and CS21 to CS2m may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are successively arranged in a direction opposite to the +Z direction and are coupled in series between the source select transistor SST and the pipe transistor PT. The p+1-th to n-th memory cells MCp+1 to MCn are successively arranged in the +Z direction and are coupled in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

Respective gates of the pipe transistors PT of the cell strings are coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1m in the first row are coupled to a first drain select line DSL1. Drain select transistors of the cell strings CS21 to CS2m in the second row are coupled to a second drain select line DSL2.

Cell strings arranged in the column direction may be coupled to bit lines extending in the column direction. In FIG. 4, cell strings CS11 and CS21 in a first column are coupled to a first bit line BL1. Cell strings CS1m and CS2m in an m-th column are coupled to an m-th bit line BLm.

Memory cells coupled to the same word line in cell strings arranged in the row direction form a single page. For example, memory cells coupled to the first word line WL1, among the cell strings CS11 to CS1m in the first row, form a single page. Memory cells coupled to the first word line WL1, among the cell strings CS21 to CS2m in the second row, form another single page. When any one of the drain select lines DSL1 and DSL2 is selected, corresponding cell strings arranged in the direction of a single row may be selected. When any one of the word lines WL1 to WLn is selected, a corresponding single page may be selected from among the selected cell strings.

In an embodiment, even bit lines and odd bit lines may be provided in lieu of the first to m-th bit lines BL1 to BLm. Even-number-th cell strings of the cell strings CS11 to CS1m or CS21 to CS2m arranged in the row direction may be coupled to respective even bit lines. Odd-number-th cell strings of the cell strings CS11 to CS1m or CS21 to CS2m arranged in the row direction may be coupled to respective odd bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCp. Alternatively, at least one or more dummy memory cells may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the at least one dummy memory cells, each of the dummy memory cells may have a required threshold voltage. Before or after an erase operation on the memory block BLKa is performed, program operations may be performed on all or some of the dummy memory cells. When an erase operation is performed after a program operation has been performed, the dummy memory cells may have required threshold voltages by controlling voltages to be applied to the dummy word lines coupled to the respective dummy memory cells.

Figure 5:
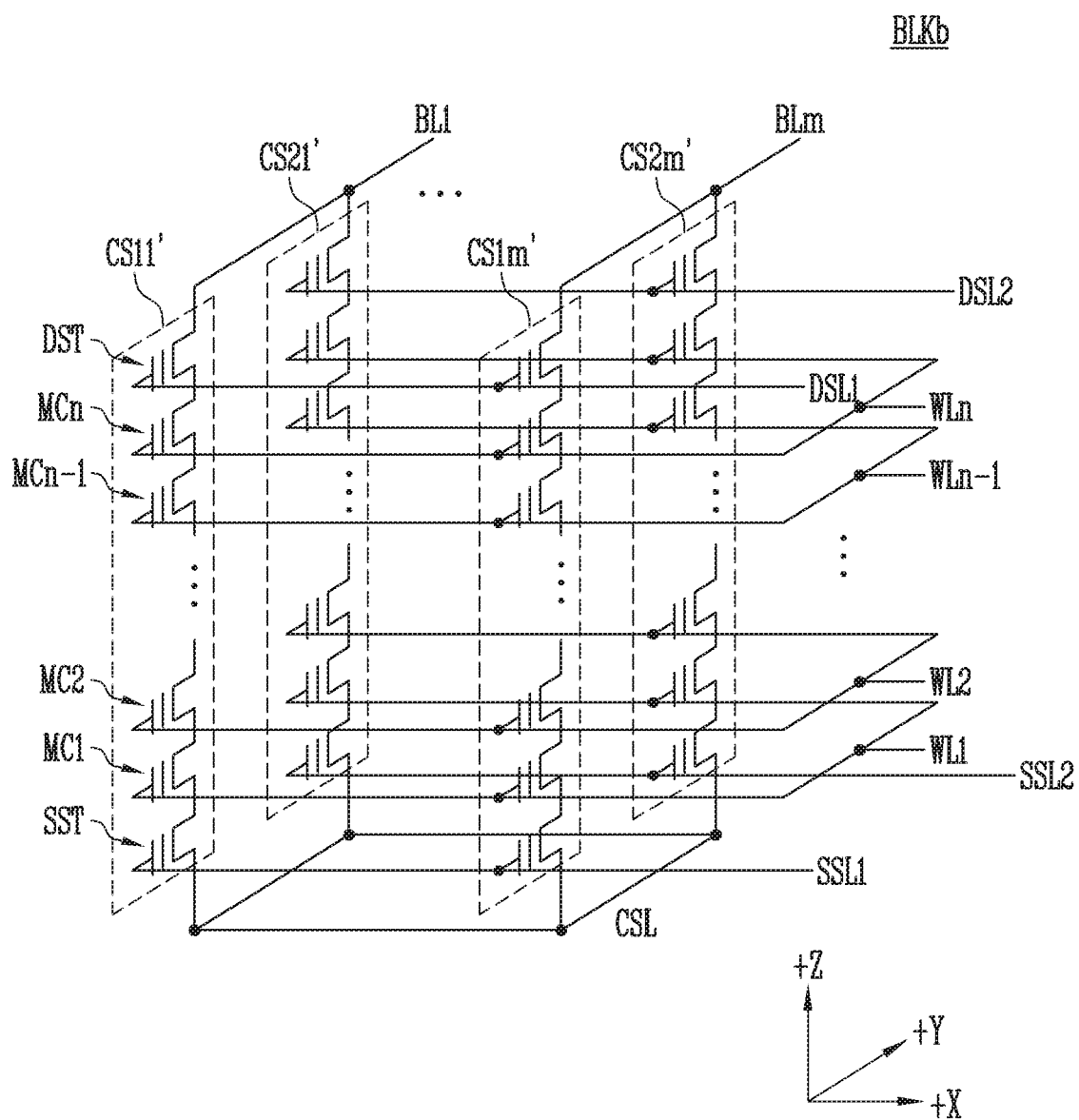
FIG. 5 is a circuit diagram illustrating any one memory block BLKb of the memory blocks BLK1 to BLKz of FIG. 3, in accordance with an embodiment of the present disclosure.

FIG. 5 is a circuit diagram illustrating any one memory block BLKb of the memory blocks BLK1 to BLKz of FIG. 3, in accordance with an embodiment of the present disclosure.

Referring to FIG. 5, the memory block BLKb may include a plurality of cell strings CS11' to CS1m' and CS21' to CS2m'. Each of the cell strings CS11' to CS1m' and CS21' to CS2m' extends in the +Z direction. Each of the cell strings CS11' to CS1m' and CS21' to CS2m' may include at least one source select transistor SST, first to n-th memory cells MC1 to MCn, and at least one drain select transistor DST which are stacked on a substrate (not shown) provided in a lower portion of the memory block BLK1'.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1m' arranged in a first row may be coupled to a first source select line SSL1. Source select transistors of the cell strings CS21' to CS2m' arranged in a second row may be coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequently, the memory block BLKb of FIG. 5 may have an equivalent circuit similar to that of the memory block BLKa of FIG. 4 except that a pipe transistor PT is excluded from each cell string.

In an embodiment, even bit lines and odd bit lines may be provided in lieu of the first to m-th bit lines BL1 to BLm. Even-numbered cell strings among the cell strings CS11' to CS1m' or CS21' to CS2m' arranged in the row direction may be coupled to the respective even bit lines, and odd-numbered cell strings among the cell strings CS11' to CS1m' or CS21' to CS2m' arranged in the row direction may be coupled to the respective odd bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCn. Alternatively, at least one or more dummy memory cells may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the at least one dummy memory cells, each of the dummy memory cells may have a required threshold voltage. Before or after an erase operation on the memory block BLKb is performed, program operations may be performed on all or some of the dummy memory cells. When an erase operation is performed after a program operation has been performed, the dummy memory cells may have required threshold voltages by controlling voltages to be applied to the dummy word lines coupled to the respective dummy memory cells.

Figure 6:
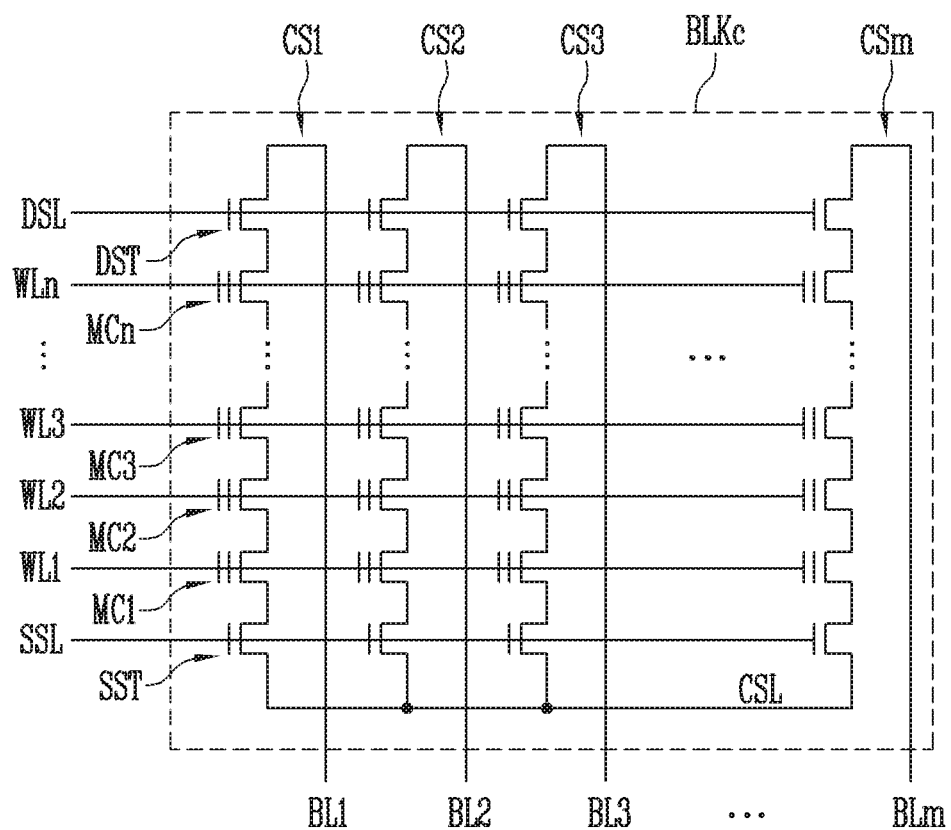
FIG. 6 is a circuit diagram illustrating any one memory block BLKc of the memory blocks BLK1 to BLKz included in the memory cell array 110 of FIG. 2, in accordance with an embodiment of the present disclosure.

FIG. 6 is a circuit diagram illustrating any one memory block BLKc of the memory blocks BLK1 to BLKz included in the memory cell array 110 of FIG. 2, in accordance with an embodiment of the present disclosure.

Referring to FIG. 6, the memory block BLKc includes a plurality of cell strings CS1 to CSm. The plurality of cell strings CS1 to CSm may be respectively coupled to a plurality of bit lines BL1 to BLm. Each of the cell strings CS1 to CSm includes at least one source select transistor SST, first to n-th memory cells MC1 to MCn, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCn.

The first to n-th memory cells MC1 to MCn in each cell string are coupled between the source select transistor SST and the drain select transistor DST.

The drain select transistor DST of each cell string is coupled between the corresponding bit line and the memory cells MC1 to MCn.

Memory cells coupled to the same word line may form a single page. The cell strings CS1 to CSm may be selected by selecting the drain select line DSL. When any one of the word lines WL1 to WLn is selected, a corresponding single page may be selected from among the selected cell strings.

In an embodiment, even bit lines and odd bit lines may be provided in lieu of the first to m-th bit lines BL1 to BLm. Even-numbered cell strings of the cell strings CS1 to CSm may be coupled to the respective even bit lines, and odd-numbered cell strings may be coupled to the respective odd bit lines.

As illustrated in FIGS. 3 to 5, the memory cell array 110 of the semiconductor memory device 100 may be formed of a memory cell array having a three-dimensional structure. Alternatively, as illustrated in FIG. 6, the memory cell array 110 of the semiconductor memory device 100 may be formed of a memory cell array having a two-dimensional structure.

Figure 7:
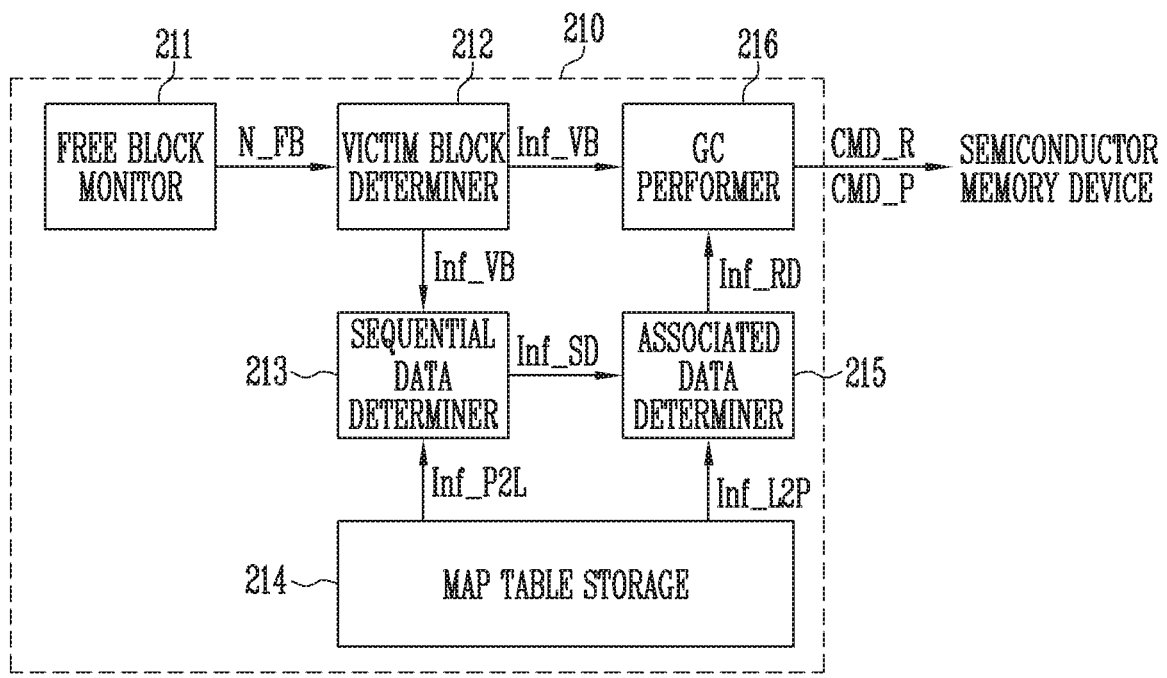
FIG. 7 is a block diagram illustrating a GC controller 210 of a controller 200 in accordance with an embodiment of the present disclosure.
Figure 8:
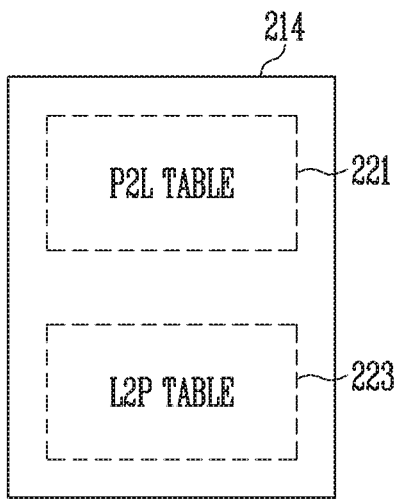
FIG. 8 is a diagram illustrating a P2L table 221 and an L2P table 223 which are stored in a map table storage 214 of FIG. 7.

FIG. 7 is a block diagram illustrating the GC controller 210 of the controller 200 in accordance with an embodiment of the present disclosure. FIG. 8 is a diagram illustrating a P2L table 221 and an L2P table 223 which are stored in a map table storage 214 of FIG. 7. Hereinafter, description will be made with reference also to FIGS. 7 and 8.

Referring to FIG. 7, the GC controller 210 may include a free block monitor 211, a victim block determiner 212, a sequential data determiner 213, a map table storage 214, an associated data determiner 215, and a garbage collection (GC) performer 216.

The free block monitor 211 may monitor the number of free blocks among the memory blocks BLK1 to BLKz included in the memory cell array 110 in the semiconductor memory device 100. In this specification, "free block" may refer to a memory block in which data is not yet stored. The free block monitor 211 may include a look-up table indicating whether each of the memory blocks BLK1 to BLKz is a free block. In an embodiment, the free block monitor 211 may periodically transmit a current number N_FB of free blocks to the victim block determiner 212. In an embodiment, the free block monitor 211 may transmit the number N_FB of free blocks to the victim block determiner 212 in response to a request from the victim block determiner 212.

The victim block determiner 212 may determine whether to perform a garbage collection operation based on the number N_FB of free blocks. For example, when the number N_FB of free blocks is less than a predetermined critical value, the victim block determiner 212 may determine to perform the garbage collection operation. When the number N_FB of free blocks is equal to or greater than the predetermined critical value, the victim block determiner 212 may determine not to perform the garbage collection operation.

When the victim block determiner 212 has determined to perform the garbage collection operation, the victim block determiner 212 may determine victim blocks on which the garbage collection operation is to be performed. The garbage collection operation may refer to an operation of storing, in target blocks, valid page data stored in the plurality of victim blocks, and releasing the victim blocks as free blocks by invalidating or erasing the data of the victim blocks. Therefore, to perform the garbage collection operation, a plurality of victim blocks each having a high invalid page ratio are required to be selected. The victim block determiner 212 may select, as a victim block, a memory block having invalid pages the number of which is greater than a predetermined first reference value RV1 among memory blocks that store data. The target block may be selected from among free blocks.

The victim block determiner 212 may generate victim block information Inf_VB which is information indicating the victim block, and transmit the victim block information Inf_VB to the sequential data determiner 213 and the GC performer 216.

The sequential data determiner 213 may determine whether data stored in the victim block includes at least a portion of sequential data, based on the victim block information Inf_VB. In detail, the sequential data determiner 213 may determine whether at least a portion of the sequential data is included in valid page data stored in the victim block, based on physical-logical address information Inf_P2L from the map data storage 214.

The term "sequential data" may be data which is stored in a plurality of pages, and may refer to data having successive logical addresses, i.e., successive logical block addresses LBA.

The physical-logical address information Inf_P2L may be information indicating a logic block address corresponding to a plurality of physical pages included in the victim block. The physical-logical address information Inf_P2L may be generated from a physical-to-logical map table (hereinafter, referred to as "P2L table") stored in the map data storage 214.

The sequential data determiner 213 may generate, for each of the victim blocks, sequential data information Inf_SD indicating whether sequential data is included in valid data stored in the corresponding victim block, and transmit the sequential data information Inf_SD to the associated data determiner 215. A detailed method of generating the sequential data information Inf_SD by the sequential data determiner 213 will be described later with reference to FIG. 12.

Referring to FIG. 8, the map table storage 214 may store a P2L table (221) and a logical-to-physical map table (hereinafter, "L2P table", 223). The map table storage 214 may generate P2L address information Inf_P2L based on the P2L table and transmit the P2L address information Inf_P2L to the sequential data determiner 213. The map table storage 214 may generate L2P address information Inf_L2P based on the L2P table and transmit the L2P address information Inf_L2P to the associated data determiner 215. The L2P address information Inf_L2P may be information indicating physical addresses corresponding to the respective successive logical block addresses.

Referring again to FIG. 7, the associated data determiner 215 may determine associated data based on the sequential data information Inf_SD from the sequential data determiner 213 and the L2P address information Inf_L2P from the map table storage 214. The associated data may refer to data associated with at least a portion of sequential data included in valid page data stored in a victim block. With reference to the victim block, the associated data may be stored in other victim blocks or a normal block. The associated data may form sequential data together with the at least a portion of the sequential data included in valid page data stored in the victim block. The associated data determiner 215 may generate associated data information Inf_RD indicating the associated data and transmit the associated data information Inf_RD to the GC performer 216. A detailed method of determining associated data by the associated data determiner 215 will be described later with reference to FIG. 9.

The GC performer 216 may control the semiconductor memory device to perform a garbage collection operation on the victim block based on the victim block information Inf_VB and the associated data information Inf_RD. In detail, the GC performer 216 may transmit a read command CMD_R and a program command CMD_P to the semiconductor memory device and thus control the semiconductor memory device to perform the garbage collection operation. The GC performer 216 of the GC controller 210 in accordance with an embodiment of the present disclosure may control the semiconductor memory device 100 to copy not only the valid data included in the victim block but also the associated data determined by the associated data determiner 215 to the target block. Hence, sequential characteristics of data stored in the semiconductor memory device 100 after the garbage collection operation has been performed may be enhanced. Consequently, the read speed of the semiconductor memory device 100 may be enhanced.

Figure 9:
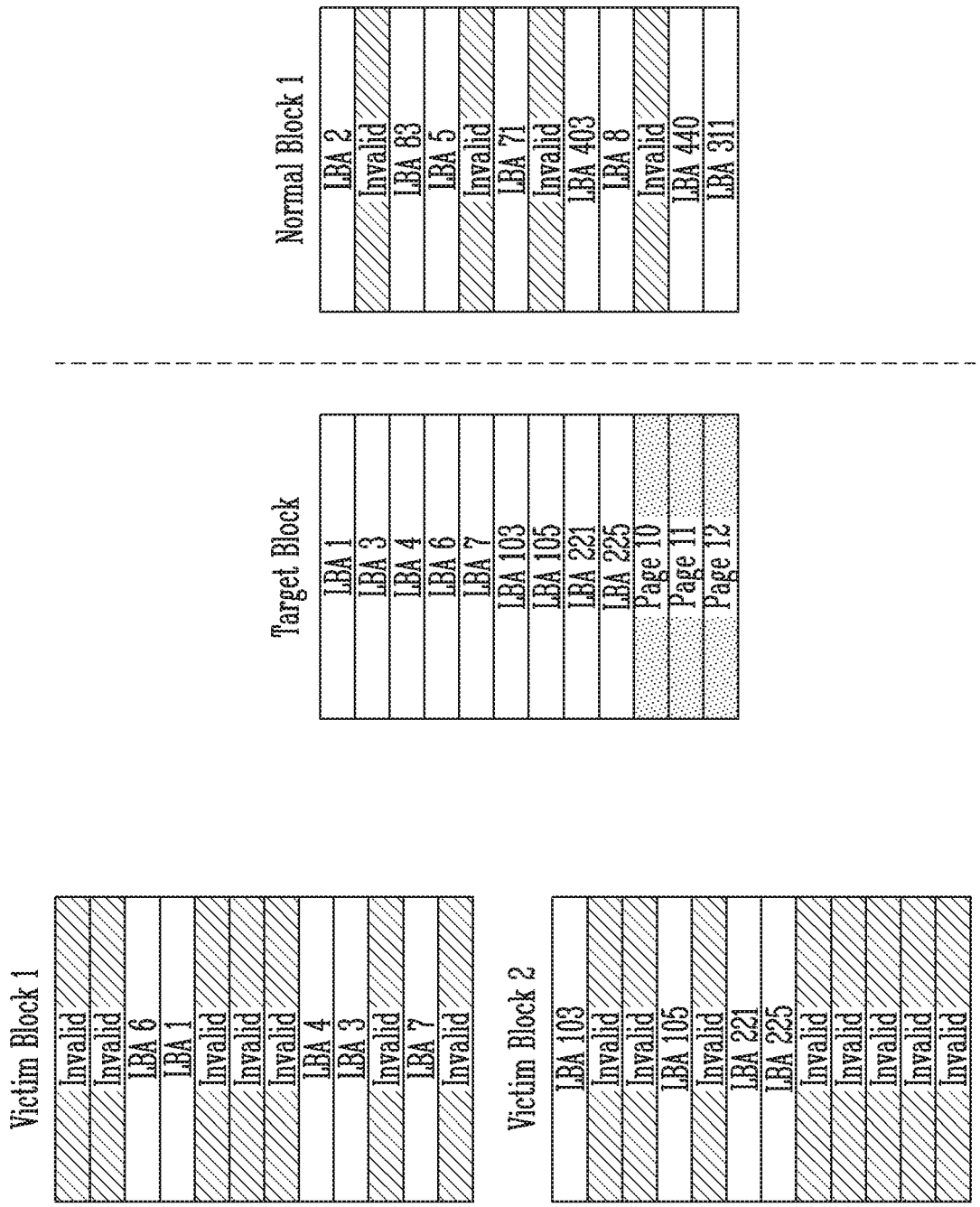
FIG. 9 is a diagram for describing a garbage collection operation in accordance with an embodiment of the present disclosure.

FIG. 9 is a diagram for describing a garbage collection operation in accordance with an embodiment of the present disclosure.

Referring to FIG. 9, there are illustrated a first victim block, a second victim block, a target block, and a first normal block.

In an embodiment of FIG. 9, the first victim block includes seven invalid pages and five valid pages. The first victim block stores, in the valid pages, data corresponding to a sixth logical block address LBA 6, a first logical block address LBA 1, a fourth logical block address LBA 4, a third logical block address LBA 3, and a seventh logical block address LBA 7.

The second victim block includes eight invalid pages and four valid pages. The second victim block stores, in the valid pages, data corresponding to a one-hundred-third logical block address LBA 103, a one-hundred-fifth logical block address LBA 105, a two-hundred-twenty-first logical block address LBA 221, and a two-hundred-twenty-fifth logical block address LBA 225.

As illustrated in FIG. 9, the first normal block includes four invalid pages and eight valid pages. Since the number of invalid pages included in the first normal block is comparatively small, the first normal block is not selected as a victim block.

During a garbage collection operation, data stored in the valid pages of the first and second victim blocks are read and programmed to the target block. During this process, to enhance the sequential characteristics of the data, the data stored in the valid pages of the victim blocks may be stored in the target block in a sequence different from a sequence in which the data is stored in the valid pages of the victim blocks. As illustrated in FIG. 9, when the data stored in the first victim block is stored in the target block, the logical block addresses thereof may be arranged in numerical order. In other words, when the data that has been stored in the first victim block in a sequence of the sixth logical block address LBA 6, the first logical block address LBA 1, the fourth logical block address LBA 4, the third logical block address LBA 3, and the seventh logical block address LBA 7, is stored in the target block, the data may be stored in the target block in a sequence of the first logical block address LBA 1, the third logical block address LBA 3, the fourth logical block address LBA 4, the sixth logical block address LBA 6, and the seventh logical block address LBA 7. In the case of the second victim block, because the logical block addresses have been already arranged in numeral order, the order of data to be stored in the target block may not be changed.

Referring to FIG. 9, data corresponding to a second logical block address LBA 2, a fifth logical block address LBA 5, and an eighth logical block address LBA8 is stored in the first normal block. However, since the first normal block has not been selected as a victim block, the data corresponding to the second logical block address LBA 2, the fifth logical block address LBA 5, and the eighth logical block address LBA8 is not stored in the target block during the garbage collection operation. Therefore, even though the data that are stored in the target block and corresponds to the first logical block address LBA 1, the third logical block address LBA 3, the fourth logical block address LBA 4, the sixth logical block address LBA 6, and the seventh logical block address LBA 7 forms sequential data along with the data corresponding to the second logical block address LBA 2, the fifth logical block address LBA 5, and the eighth logical block address LBA 8, the data may be stored in the target block with reduced sequential characteristics. This may cause a reduction in read speed during an operation of reading the sequential data corresponding to the first to eighth logical block addresses LBA 1 to LBA 8.

In the controller and the method of operating the controller in accordance with an embodiment of the present disclosure, it may be determined whether valid data included in the victim block includes sequential data, and associated data may be identified based on a result of the determination. Subsequently, during the garbage collection operation, the valid data included in the victim block and the associated data are copied to the target block. Consequently, the sequential characteristics of the data stored in the target block are enhanced, and the read speed of the semiconductor memory device may be enhanced.

Figure 10:
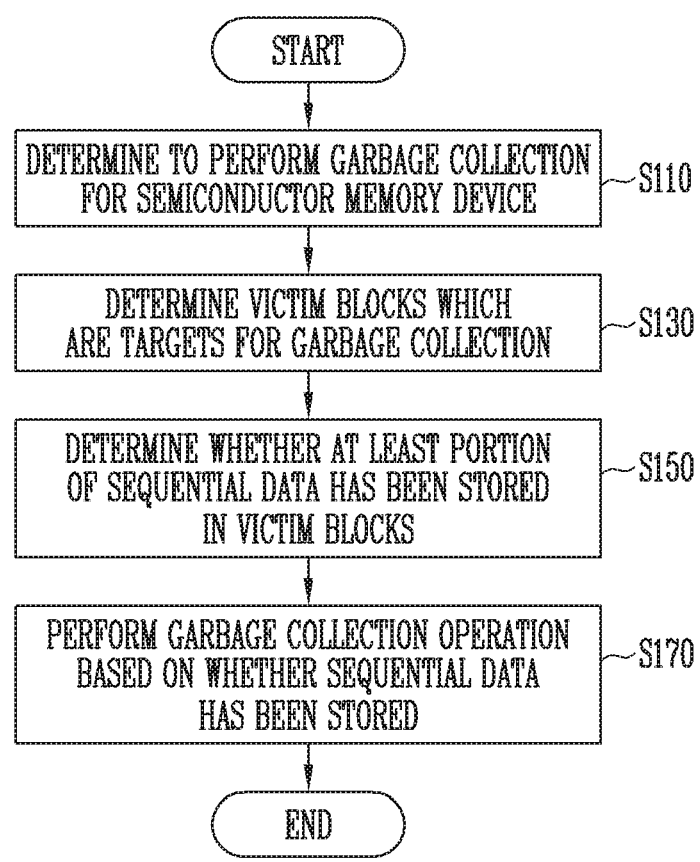
FIG. 10 is a flowchart for describing a method of operating a controller in accordance with an embodiment of the present disclosure.

FIG. 10 is a flowchart for describing a method of operating the controller 200 in accordance with an embodiment of the present disclosure. Hereinafter, description will be made with reference to FIG. 7 together.

At step S110, it may be determined to perform a garbage collection operation for the semiconductor memory device. When the number of free blocks included in the semiconductor memory device 100 is insufficient, the controller 200 may select victim blocks each having a high invalid page ratio, store in a target block data stored in valid pages of the victim blocks, and then determine to perform a garbage collection operation of releasing the victim blocks as free blocks. To this end, the free block monitor 211 may monitor a current number N_FB of free blocks, and the victim block determiner 212 may determine to perform the garbage collection operation when the number N_FB of free blocks is less than the predetermined critical value.

Thereafter, at step S130, the victim block determiner 212 may determine victim blocks which are targets of the garbage collection operation which is to be performed. At step S130, the victim block determiner 212 may determine, as a victim block, each memory block in which the number of invalid pages is greater than the first reference value RV1 among the memory blocks BLK1 to BLKz included in the memory cell array 110 of the semiconductor memory device 100. A detailed embodiment of step S130 will be described later with reference to FIG. 11.

At step S150, the sequential data determiner 213 may determine whether at least a portion of sequential data has been stored in the victim blocks. To this end, the sequential data determiner 213 may receive victim block information Inf_VB from the victim block determiner 212 and receive P2L address information Inf_P2L from the map table storage 214. The sequential data determiner 213 may generate, based on the P2L address information Inf_P2L for the victim blocks, sequential data information Inf_SD indicating whether data included in the victim blocks include at least a portion of sequential data. A detailed embodiment of step S150 will be described later with reference to FIG. 12.

At step S170, the GC controller 210 may perform a garbage collection operation based on whether sequential data is stored in the victim blocks. To this end, the associated data determiner 215 may receive sequential data information Inf_SD from the sequential data determiner 213 and receive L2P address information Inf_L2P from the map table storage 214. The associated data determiner 215 may generate associated data information Inf_RD based on the sequential data information Inf_SD and the L2P address information Inf_L2P. The associated data information Inf_RD may refer to information indicating the associated data forming sequential data together with the at least a portion of the sequential data included in valid page data stored in the victim block. With reference to the victim block, the associated data may be stored in other victim blocks or a normal block. The GC performer 216 may receive victim block information Inf_VB from the victim block determiner 212 and receive associated data information Inf_RD from the associated data determiner 215. The GC performer 216 may control the semiconductor memory device 100 to perform a garbage collection operation on the victim block based on the victim block information Inf_VB and the associated data information Inf_RD. During this process, the GC performer 216 may generate a read command CMD_R and a program command CMD_P for performing the garbage collection operation and transmit the read command CMD_R and the program command CMD_P to the semiconductor memory device 100. A detailed embodiment of step S170 will be described later with reference to FIG. 13.

Figure 11:
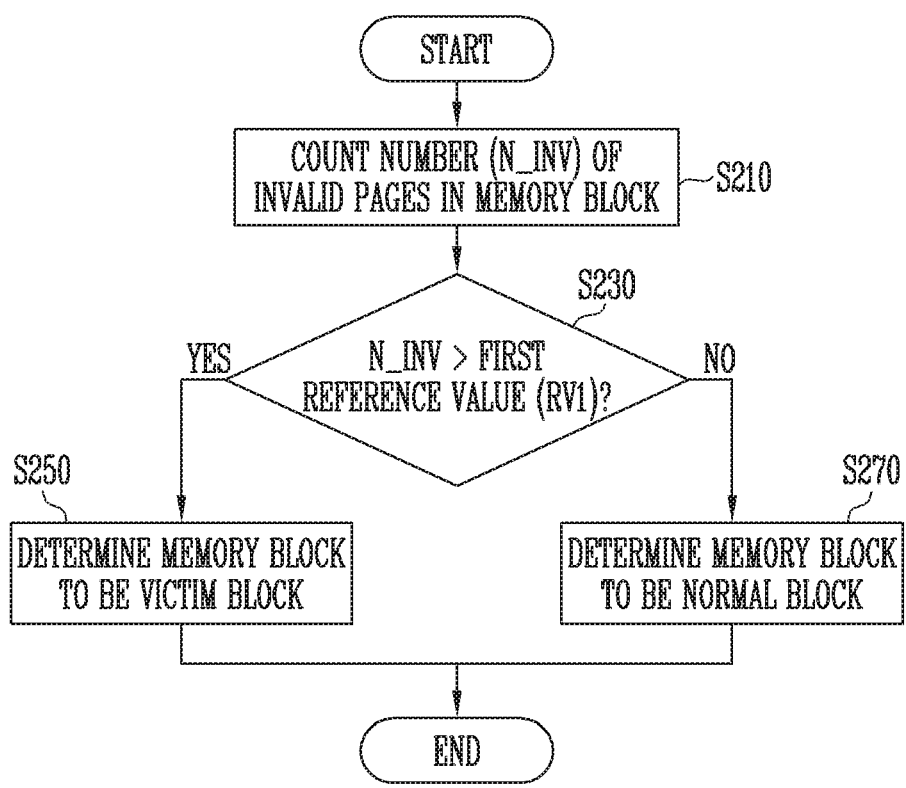
FIG. 11 is a flowchart illustrating an embodiment of step S130 of FIG. 10.

FIG. 11 is a flowchart illustrating an embodiment of step S130 of FIG. 10. Hereinafter, description will be made with reference to FIG. 7 together.

Referring to FIGS. 7 and 11 together, the victim block determiner 212 may count the number N_INV of invalid pages in a memory block which is a target to be determined among the plurality of memory blocks. The victim block determiner 212 may determine whether the number N_INV of invalid pages exceeds the first reference value RV1 (at step S230). When the number N_INV of invalid pages is greater than the first reference value RV1 (YES at step S230), the victim block determiner 212 may determine the corresponding memory block to be a victim block (at step S250). When the number N_INV of invalid pages is equal to or less than the first reference value RV1, the victim block determiner 212 may determine the corresponding memory block to be a normal block (at step S270). Each of the memory blocks may be determined to be a victim block or a normal block by performing the method illustrated in FIG. 11 on each of the corresponding memory blocks to which data has been programmed except free blocks among the plurality of memory blocks BLK1 to BLKz included in the memory cell array 110.

In the embodiment of FIG. 9, the memory blocks that respectively have the seven and eight invalid pages are determined to be respectively the first victim block and the second victim block. The memory block having the four invalid pages is determined to be the first normal block. Therefore, in the embodiment of FIG. 9, the first reference value RV1 may be any one integer of 4 to 6.

Figure 12:
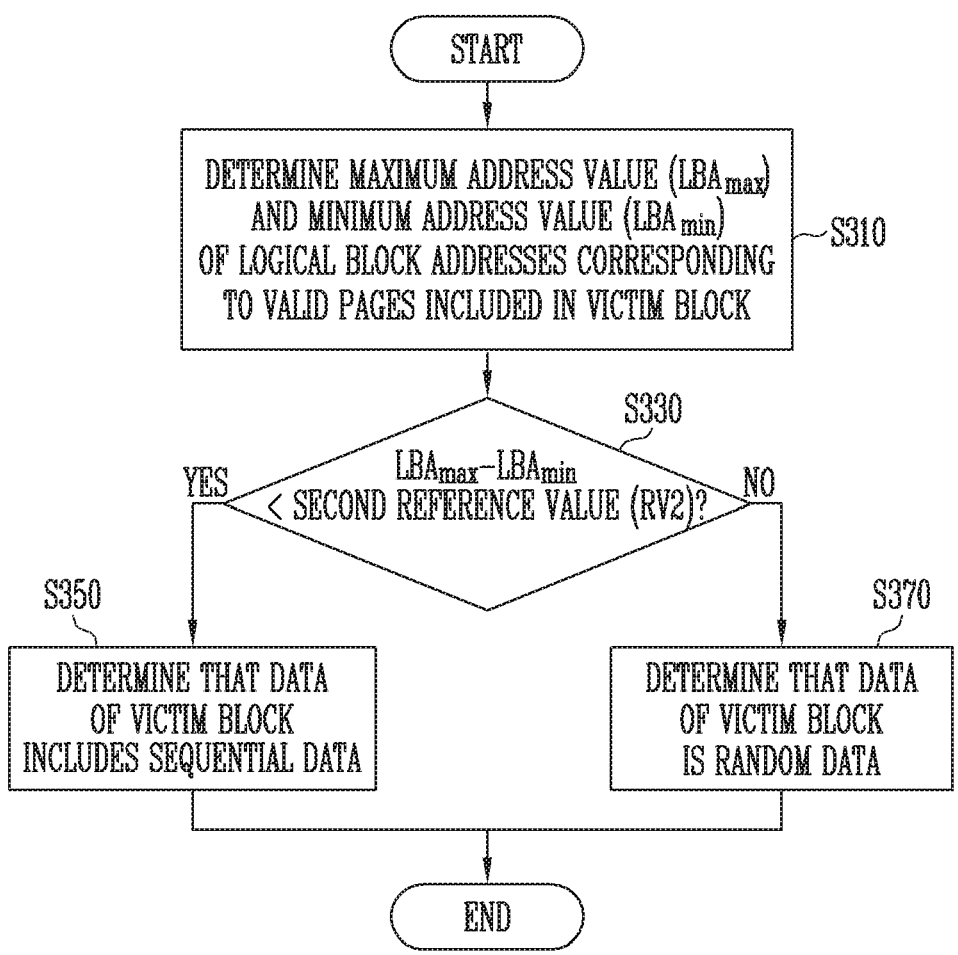
FIG. 12 is a flowchart illustrating an embodiment of step S150 of FIG. 10.

FIG. 12 is a flowchart illustrating an embodiment of step S150 of FIG. 10. Hereinafter, description will be made with reference to FIG. 7 together.

Referring to FIGS. 7 and 12 together, the sequential data determiner 213 may determine a maximum address value $LBA_{max}$ and a minimum address value $LBA_{min}$ of logical block addresses LBA respectively corresponding to valid pages included in a memory block determined to be a victim block by the victim block determiner 212. In the embodiment of FIG. 9, the maximum address value $LBA_{max}$ in the first victim block may be 7 which corresponds to the seventh logical block address LBA 7, and the minimum address value $LBA_{min}$ may be 1 which corresponds to the first logical block address LBA 1. In the embodiment of FIG. 9, the maximum address value $LBA_{max}$ in the second victim block may be 225 which corresponds to the two-hundred-twenty-fifth logical block address LBA 225, and the minimum address value $LBA_{min}$ may be 103 which corresponds to the one-hundred-third logical block address LBA 103. Here, the sequential data determiner 213 may determine the maximum address value $LBA_{max}$ and the minimum address value $LBA_{min}$ of the logical block addresses LBA corresponding to respective valid pages included in each victim block based on the P2L address information Inf_P2L from the map table storage 214. For example, the P2L address information Inf_P2L for the first victim block may include information about whether each of physical pages included in the first victim block is valid or invalid, and information about logical block addresses LBA corresponding to the valid physical pages. The sequential data determiner 213 may analyze the information included in the P2L address information Inf_P2L for the first victim block and determine a maximum address value $LBA_{max}$ and a minimum address value $LBA_{min}$ among the logical block addresses of the valid pages included in the first victim block. Likewise, the sequential data determiner 213 may also determine a maximum address value $LBA_{max}$ and a minimum address value $LBA_{min}$ among the logical block addresses of the valid pages included in the second victim block.

At step S330, a difference between the maximum address value $LBA_{max}$ and the minimum address value $LBA_{min}$ of the logical block addresses LBA corresponding to the respective valid pages included in the victim block may be compared with a predetermined second reference value RV2. In the embodiment of FIG. 9, the maximum address value $LBA_{max}$ in the first victim block may be 7 which corresponds to the seventh logical block address LBA 7, and the minimum address value $LBA_{min}$ may be 1 which corresponds to the first logical block address LBA 1. Thus, the difference may be "6". If the difference between the maximum address value $LBA_{max}$ and the minimum address value $LBA_{min}$ of the logical block addresses LBA corresponding to the respective valid pages included in the victim block is less than the second reference value RV2 (YES at step S330), this may mean that data of logical block addresses adjacent to each other has been intensively written to the corresponding memory block. Hence, in this case, it may be determined that valid data stored in the corresponding victim block, i.e., the first victim block, includes sequential data (at step S350).

The maximum address value $LBA_{max}$ in the second victim block may be 225 which corresponds to the two-hundred-twenty-fifth logical block address LBA 225, and the minimum address value $LBA_{min}$ may be 103 which corresponds to the one-hundred-third logical block address LBA 103. Thus, the difference may be "122". If the difference between the maximum address value $LBA_{max}$ and the minimum address value $LBA_{min}$ of the logical block addresses LBA corresponding to the respective valid pages included in the victim block is equal to or greater than the second reference value RV2 (NO at step S330), this may mean that data of logical block addresses distant from each other has been scatteringly written to the corresponding memory block. Hence, in this case, it may be determined that valid data stored in the corresponding victim block, i.e., the second victim block, is random data (at step S370).

In an embodiment, the second reference value may be selected as a value close to the number of physical pages included in each of the memory blocks BLK1 to BLKz. In the embodiment of FIG. 9, each memory block may include twelve physical pages. Therefore, in an embodiment, the second reference value may be "12". In an embodiment, a reason why the second reference value is determined to be the number of physical pages in the memory block is outlined below.

During an initial program operation, in the case where data corresponding to the first to twelfth logical block addresses LBA 1 to LBA 12 are written to the first victim block, when data corresponding to the first logical block address LBA 1 and the twelfth logical block address LBA 12 remains in the first victim block at a time point corresponding to a garbage collection operation, a difference between the maximum address value $LBA_{max}$ and the minimum address value $LBA_{min}$ of the logical block addresses LBA may be 11 obtained by subtracting 1 from 12. In other words, when sequential data is written to the entirety of one memory block, the maximum of a difference between the maximum address value $LBA_{max}$ and the minimum address value $LBA_{min}$ of the logical block addresses LBA of valid page data when the corresponding memory block is selected as a victim block may be 11 obtained by subtracting 1 from the entire number of physical pages in the memory block. Therefore, in an embodiment, the second reference value may be determined to be the number of physical pages included in the memory block. However, this is only for illustrative purposes, and the present disclosure is not limited thereto. The second reference value RV2 may be determined by other methods.

In an embodiment, at step S330, whether data stored in the victim block is sequential data may be determined based on a standard deviation of the values of the logical block addresses LBA of the valid pages included in the victim block. For example, since LBA values indicating the respective values of the valid pages in the first victim block are 1, 3, 4, 6, and 7, an average of the corresponding values is 4.2, a variance thereof is 4.56, and a standard deviation thereof is approximately 2.13. Since LBA values indicating the respective values of the valid pages in the second victim block are 103, 105, 221, and 225, an average of the corresponding values is 163.5, a variance thereof is 3542.75, and a standard deviation thereof is approximately 59.52. According to the foregoing result, it may be understood that, as the data is close to sequential data, the standard deviation of the LBA values is reduced, and as the data is close to random data, the standard deviation of the LBA values is increased. Hence, if the standard deviation of LBA numbers of the valid pages in the victim block is less than a predetermined value, the data of the corresponding block may be determined to be sequential data.

Figure 13:
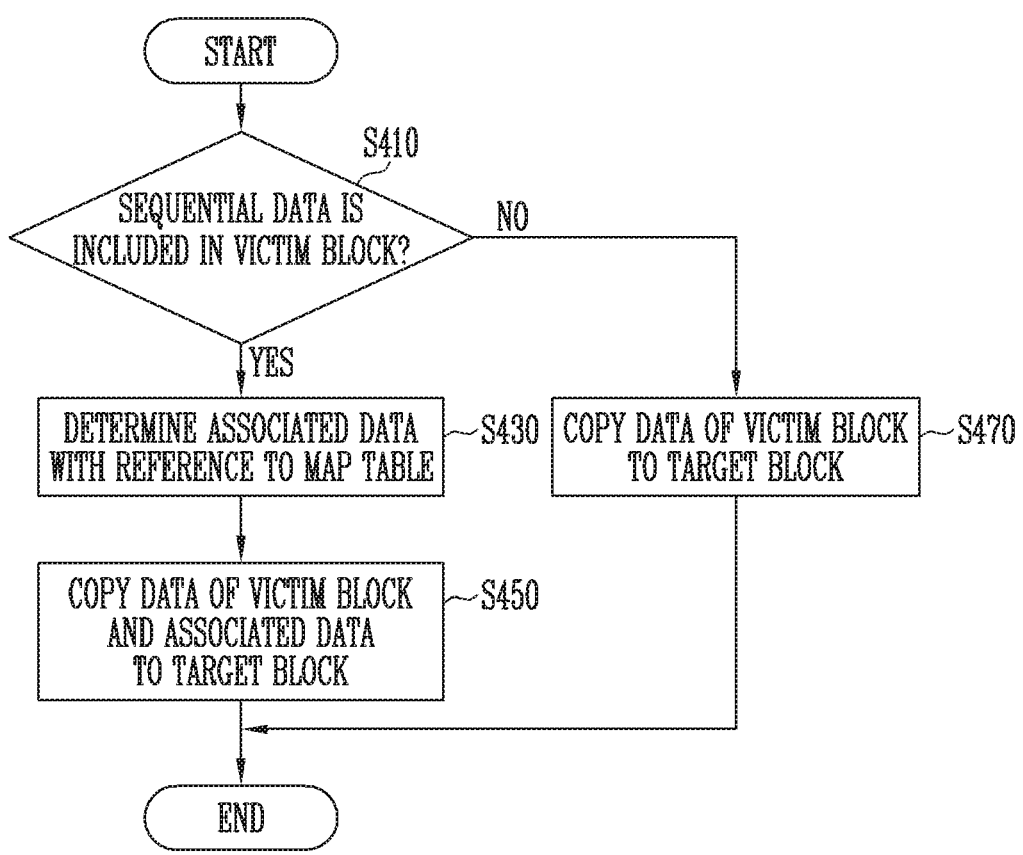
FIG. 13 is a flowchart illustrating an embodiment of step S170 of FIG. 10.

FIG. 13 is a flowchart illustrating an embodiment of step S170 of FIG. 10. Hereinafter, description will be made with reference to FIG. 7 together.

At step S150, the sequential data determiner 213 may transmit, to the associated data determiner 215, sequential data information Inf_SD indicating whether data stored in valid pages of a corresponding victim block is sequential data. The associated data determiner 215 may analyze the sequential data information Inf_SD and determine whether the victim block includes sequential data (at step S410).

When the victim block includes sequential data (YES at step S410), the associated data determiner 215 may determine data associated with the valid data stored in the victim block (at step S430). At this step, the associated data determiner 215 may determine associated data with reference to a map table. In detail, the associated data determiner 215 may determine the associated data based on the L2P physical information Inf_L2P from the map table storage 214.

The associated data may refer to data associated with at least a portion of sequential data included in valid page data stored in a victim block. With reference to the victim block, the associated data may be stored in other victim blocks or a normal block. The associated data may form sequential data together with the at least a portion of the sequential data included in valid page data stored in the victim block. In the embodiment of FIG. 9, when the data of the first victim block is determined to be sequential data, data of the first normal block that has sequential characteristics among the data stored in the first victim block may be determined to be associated data. In the embodiment of FIG. 9, the valid data that is stored in the first victim block may be data corresponding to the first logical block address LBA 1, the third logical block address LBA 3, the fourth logical block address LBA 4, the sixth logical block address LBA 6, and the seventh logical block address LBA 7. Together with the valid data that is stored in the first victim block, the data of the first normal block that forms sequential data may be data corresponding to the second logical block address LBA 2, the fifth logical block address LBA 5, and the eighth logical block address LBA 8. In other words, the data corresponding to the second logical block address LBA 2, the fifth logical block address LBA 5, and the eighth logical block address LBA 8 may be determined to be the associated data for the valid data stored in the first victim block.

If the associated data is determined, the associated data determiner 215 may transmit associated data information Inf_RD that is information about the corresponding associated data to the GC performer 216. The GC performer 216 may copy, to the target block, the data of the victim blocks and the associated data selected based on the associated data information Inf_RD (at step S450). During this process, the GC performer 216 may generate a read command CMD_R and a program command CMD_P and transmit the read command CMD_R and the program command CMD_P to the semiconductor memory device 100. Hence, during the garbage collection process, the sequential characteristics of the data may be enhanced. Consequently, the read operation speed of the semiconductor memory device 100 may be enhanced.

When the victim block does not include sequential data (NO at step S410), the associated data determiner 215 may not determine associated data. In this case, the associated data determiner 215 may transmit, to the GC performer 216, associated data information Inf_RD indicating that associated data has not been determined. The GC performer 216 may copy only the data of the victim block to the target block (at step S470).

Figure 14:
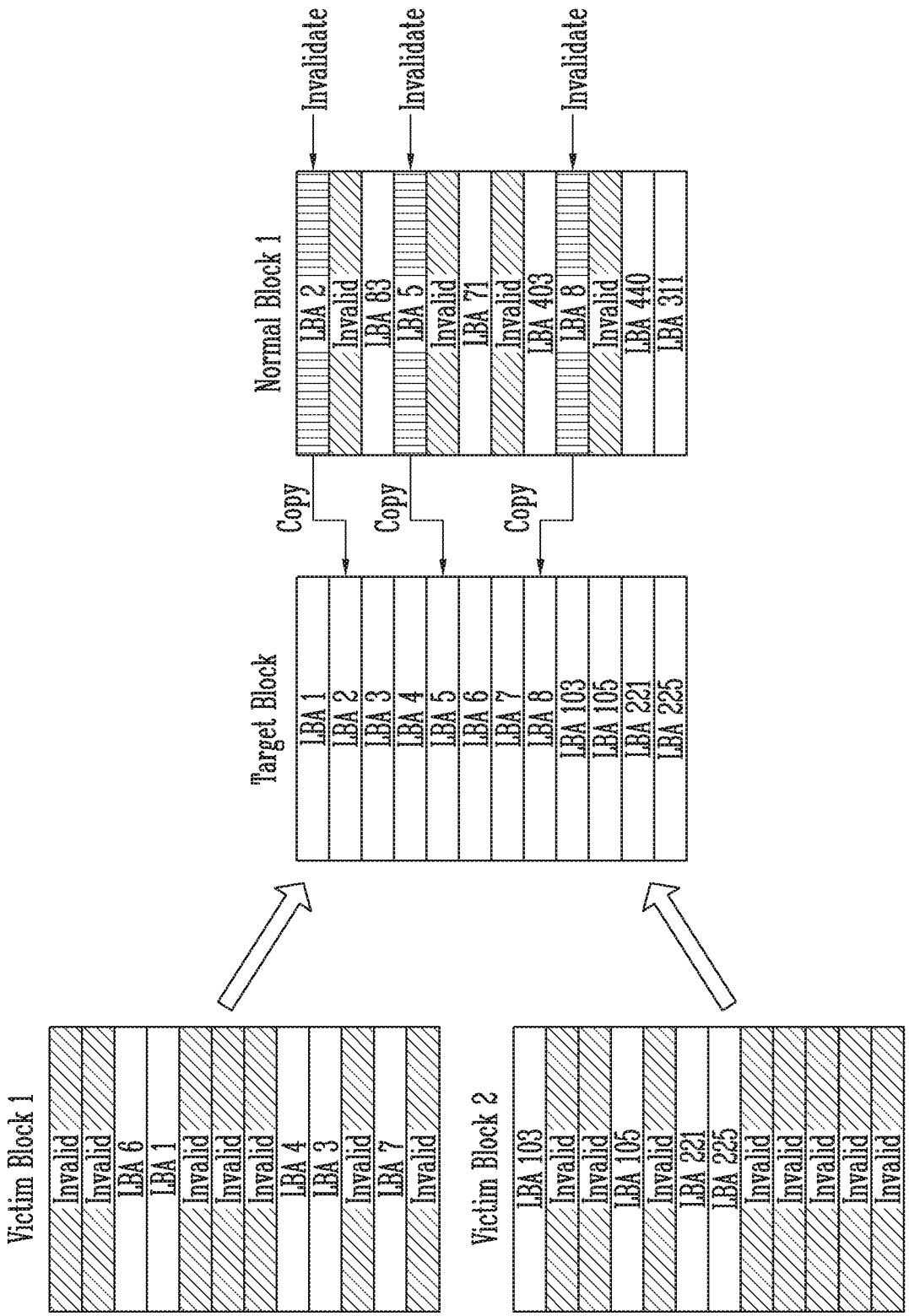
FIG. 14 is a diagram for describing a method of operating the controller in accordance with an embodiment of the present disclosure.

FIG. 14 is a diagram for describing a method of operating the controller 200 in accordance with an embodiment of the present disclosure. Hereinafter, description will be made with reference to FIGS. 10 to 13 together.

At step S110 of FIG. 10, the controller 200 may determine to perform a garbage collection for the semiconductor memory device 100. Thereafter, at step S130, victim blocks that are targets of the garbage collection may be determined.

Step S130 of FIG. 10 may be performed through sub-steps S210, S230, S250, and S270 of FIG. 11. In an embodiment of FIG. 14, the first reference value RV1 used at step S230 of FIG. 11 may be "5". In the case of the first victim block, because the number of invalid pages is 7, the corresponding memory block has been determined to be a victim block by the determination of step S230 (at step S250). Also, in the case of the second victim block, because the number of invalid pages is 8, the corresponding memory block has been determined to be a victim block by the determination of step S230 (at step S250). In the case of the first normal block, because the number of invalid pages is 4, the corresponding memory block has been determined to be a normal block by the determination of step S230 (at step S270).

Subsequently, step S150 of FIG. 10 is performed. Step S150 may be performed through sub-steps S310, S330, S350, and S370 of FIG. 12. In the embodiment of FIG. 14, the second reference value RV2 used at step S330 of FIG. 12 may be 12 that is the number of pages in the memory block. The maximum address value $LBA_{max}$ of the logical block addresses in the first victim block is 7, and the minimum address value $LBA_{min}$ is 1. A difference therebetween is 6. Therefore, as a result of the determination at step S330, because 6 is less than 12 that is the second reference value RV2, it may be determined that the data of the first victim block includes at least a portion of sequential data (at step S350).

The maximum address value $LBA_{max}$ of the logical block addresses in the second victim block is 225, and the minimum address value $LBA_{min}$ is 103. A difference therebetween is 122. Therefore, as a result of the determination at step S330, because 122 is greater than 12 which is the second reference value RV2, it may be determined that the data of the second victim block is random data (at step S370).

Subsequently, step S170 of FIG. 10 is performed. Step S170 may be performed through sub-steps S410, S430, S450, and S470 of FIG. 13. In an embodiment of FIG. 14, because it may be determined that the data included in the first victim block includes sequential data (YES at step S410), associated data may be determined with reference to the map table (at step S430). In detail, data of other memory blocks for forming sequential data along with the valid data stored in the first victim block may be searched for. The valid data stored in the first victim block are data corresponding to the first logical block address LBA 1, the third logical block address LBA 3, the fourth logical block address LBA 4, the sixth logical block address LBA 6, and the seventh logical block address LBA 7. Thus, data of the first normal memory block that forms sequential data along with the foregoing data, in other words, data corresponding to the second logical block address LBA 2, the fifth logical block address LBA 5, and the eighth logical block address LBA 8, may be determined to be the associated data. Subsequently, during the garbage collection operation, the associated data may be copied to the target block (at step S450). After the associated data has been copied to the target block, the page of the first normal memory block that has had the associated data may be invalidated.

Through the foregoing process, the sequential data that have been diffusely stored in the first victim block and the first normal block may be stored in the target block through the garbage collection operation. As a result, the sequential characteristics of data which are stored in the target block after the garbage collection operation may be enhanced.

Since the data included in the second victim block may be determined to be random data (NO at step S410), valid data that is stored in the second victim block may be copied to the target block (at step S470). During this process, associated data of the data stored in the second victim block may not be determined.

Figure 15:
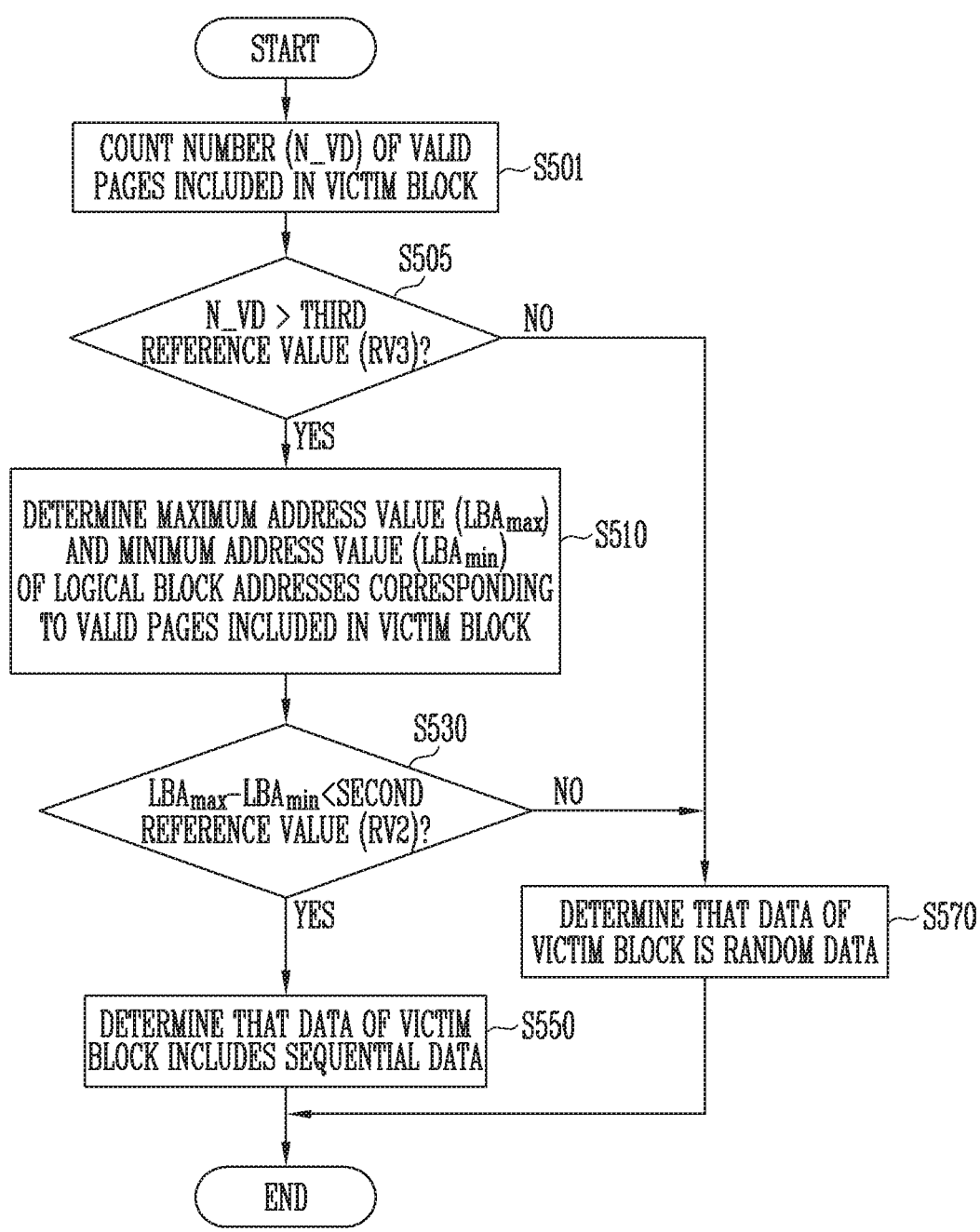
FIG. 15 is a flowchart illustrating an embodiment of step S150 of FIG. 10.

FIG. 15 is a flowchart illustrating an embodiment of step S150 of FIG. 10. Hereinafter, description will be made with reference to FIG. 7 together.

Referring to FIGS. 1 and 7 together, the sequential data determiner 213 may count the number N_VD of valid pages included in the victim block (at step S501). During this process, the sequential data determiner 213 may refer to the P2L address information Inf_P2L corresponding to the victim block.

Thereafter, the sequential data determiner 213 may determine whether the number N_VD of valid pages included in the victim block is greater than a predetermined third reference value (at step S505). When the number N_VD of valid pages included in the victim block is equal to or less than the third reference value, the sequential data determiner S505 may determine the data of the corresponding victim block to be random data.

When the number N_VD of valid pages included in the victim block is greater than the third reference value (YES at step S505), the sequential data determiner S505 may determine the data of the victim block to be sequential data or random data at step S510, S530, S550, and S570. Steps S510, S530, S550, and S570 of FIG. 15 may be substantially equal to steps S310, S330, S350, and S370 of FIG. 12. Therefore, repetitive description of steps S510, S530, S550, and S570 will be omitted.

A reason why, as a result of the determination at step S505 of FIG. 15, when the number of valid pages included in the victim block is less than the third reference value RV3, the data of the corresponding victim block is determined to be random data is outlined below. When the number of pieces of valid data included in the victim block is relatively small, an operation of searching for associated data pertaining to the valid data is inefficient, and a lot of time is required to perform the searching operation. Therefore, when the number of pieces of valid data included in the victim block is equal to or greater than a predetermined value, whether the data of the corresponding victim block includes sequential data or the data of the victim block is random data is determined at steps S510, S530, S550, and S570.

The third reference value RV3 may be set to various values as necessary. The third reference value RV3 may be a value equal to or less than the first reference value RV1 used at step S230 of FIG. 11. When the third reference value RV3 is set to an excessively small value, data of victim blocks that include a relatively small number of invalid pages may also be determined to be sequential data. In this case, the time it takes to search for associated data may be increased. When the third reference value RV3 is set to an excessively large value, conditions needed to determine the data of the victim blocks to be sequential data may be excessively strict. Hence, the third reference value RV3 may be carefully determined through various experiments.

As described above, in a controller and a method of operating the controller in accordance with an embodiment of the present disclosure, the sequential characteristics of data during a garbage collection operation may be enhanced. Consequently, the read speed of the semiconductor memory device 100 may be improved.

Figure 16:
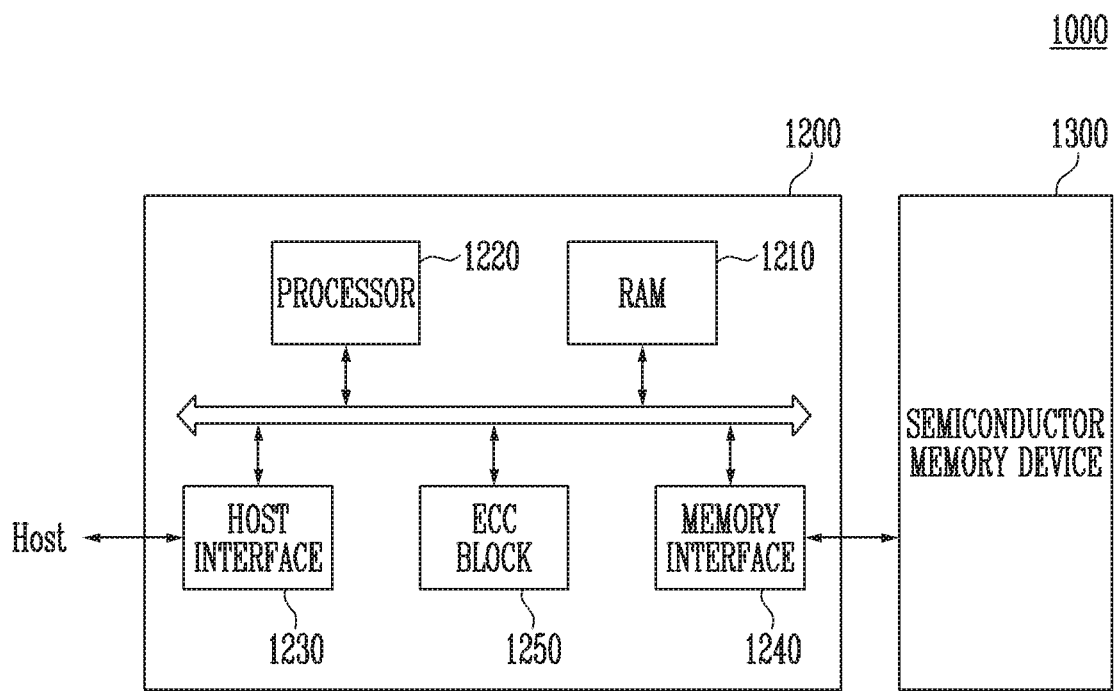
FIG. 16 is a block diagram illustrating a memory system 1000 including the semiconductor memory device of FIG. 2 and the controller of FIG. 7.

FIG. 16 is a block diagram illustrating a memory system 1000 including the semiconductor memory device of FIG. 2 and the controller of FIG. 7.

Referring FIG. 16, the memory system 1000 may include a semiconductor memory device 1300 and a controller 1200.

The semiconductor memory device 1300 may have the same configuration and operation as those of the semiconductor memory device described with reference to FIG. 2. Hereinafter, repetitive descriptions will be omitted.

The controller 1200 is coupled to a host and the semiconductor memory device 1300. The controller 1200 may access the semiconductor memory device 100 in response to a request from the host. For example, the controller 1200 may control read, write, remove, and background operations of the semiconductor memory device 1300. The controller 1200 may provide an interface between the semiconductor memory device 1300 and the host. The controller 1200 may drive firmware for controlling the semiconductor memory device 1300.

The controller 1200 includes a RAM (random access memory) 1210, a processor 1220, a host interface 1230, a memory interface 1240, and an error correction block 1250.

The RAM 1210 is used as at least one of an operating memory for the processor 1220, a cache memory between the semiconductor memory device 1300 and the host, and a buffer memory between the semiconductor memory device 1300 and the host.

The processor 1220 may control the overall operation of the controller 1200. The processor 1220 may control read, program, erase, and background operations of the semiconductor memory device 1000. The processor 1220 may drive firmware for controlling the semiconductor memory device 1000. The processor 1220 may perform the function of a flash translation layer (FTL). The processor 1220 may translate a logical block address (LBA), provided by the host, into a physical block address (PBA) through the FTL. The FTL may receive an LBA using a map table and translate the LBA into the PBA. An address mapping method using the FTL may be modified in various ways depending on the unit of mapping. Representative address mapping methods may include a page mapping method, a block mapping method, and a hybrid mapping method.

The host interface 1230 may include a protocol for performing data exchange between the host and the controller 1200. In an embodiment, the controller 1200 may be configured to communicate with the host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a private protocol, and the like.

The memory interface 1240 may interface with the semiconductor memory device 1300. For example, the memory interface 1240 includes a NAND interface or a NOR interface.

The error correction block 1250 may use an error correcting code (ECC) to detect and correct an error in data received from the semiconductor memory device 1300. The error correction block 1250 may correct errors from read page data using an ECC. The error correction block 1250 may correct errors using a low density parity check (LDPC) code, a Bose, Chaudhri, Hocquenghem (BCH) Code, a turbo code, a Reed-Solomon code, a convolution code, a recursive systematic code (RSC), or coded modulation such as trellis-coded modulation (TCM), block coded modulation (BCM), or hamming code.

During a read operation, the error correction block 1250 may correct errors from read page data. When a number of error bits exceeding the number of correctable bits are included in the read page data, decoding may fail. When a number of error bits less than or equal to the number of correctable bits are included in the page data, decoding may succeed. A success in decoding indicates that the corresponding read command has passed. A failure in decoding indicates that the corresponding read command has failed. When decoding succeeds, the controller 1200 may output error-corrected page data to the host.

The controller 1200 and the semiconductor memory device 1300 may be integrated into a single semiconductor device. In an embodiment, the controller 1200 and the semiconductor memory device 1300 may be integrated into a single semiconductor device to form a memory card. For example, the controller 1200 and the semiconductor memory device 1300 may be integrated into a single semiconductor device and form a memory card such as a personal computer memory card international association (PCM-CIA), a compact flash card (CF), a smart media card (SMC), a memory stick multimedia card (MMC, RS-MMC, or MMCmicro), a SD card (SD, miniSD, microSD, or SDHC), or a universal flash storage (UFS).

The controller 1200 and the semiconductor memory device 1300 may be integrated into a single semiconductor device to form a solid state drive (SSD). The SSD may include a storage device configured to store data in a semiconductor memory. When the memory system is used as the SSD, an operation speed of the host coupled to the memory system 2000 may be phenomenally improved.

In an embodiment, the memory system may be provided as one of various elements of an electronic device such as a computer, a ultra mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, one of various elements for forming a computing system, or the like.

In an embodiment, the semiconductor memory device 1300 or the memory system 1000 may be embedded in various types of packages. For example, the semiconductor memory device 1300 or the memory system 1000 may be packaged in a type such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), or the like.

Figure 17:
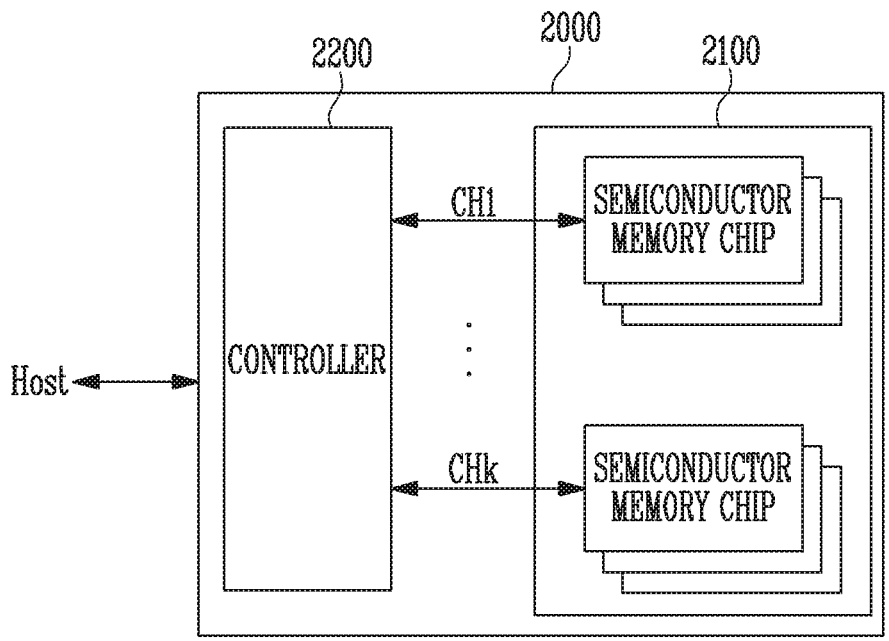
FIG. 17 is a block diagram illustrating an application example 2000 of the memory system of FIG. 16.

FIG. 17 is a block diagram illustrating an application example 2000 of the memory system of FIG. 16.

Referring FIG. 17, a memory system 2000 may include a semiconductor memory device 2100 and a controller 2200. The semiconductor memory device 2100 includes a plurality of memory chips. The semiconductor memory chips may be divided into a plurality of groups.

In FIG. 17, it is illustrated that the plurality of groups respectively communicate with the controller 2200 through first to k-th channels CH1 to CHk. Each semiconductor memory chip may have the same configuration and operation as those of a component of the semiconductor memory device 1300 described with reference to FIG. 16.

Each group may communicate with the controller 2200 through one common channel. The controller 2200 has the same configuration as that of the controller 1200 described with reference to FIG. 16 and may control a plurality of memory chips of the semiconductor memory device 2100 through the plurality of channels CH1 to CHk.

In FIG. 17, a plurality of semiconductor memory chips has been illustrated as being coupled to each channel. However, it will be understood that the memory system 2000 may be modified into a configuration such that a single memory chip is coupled to each channel.

Figure 18:
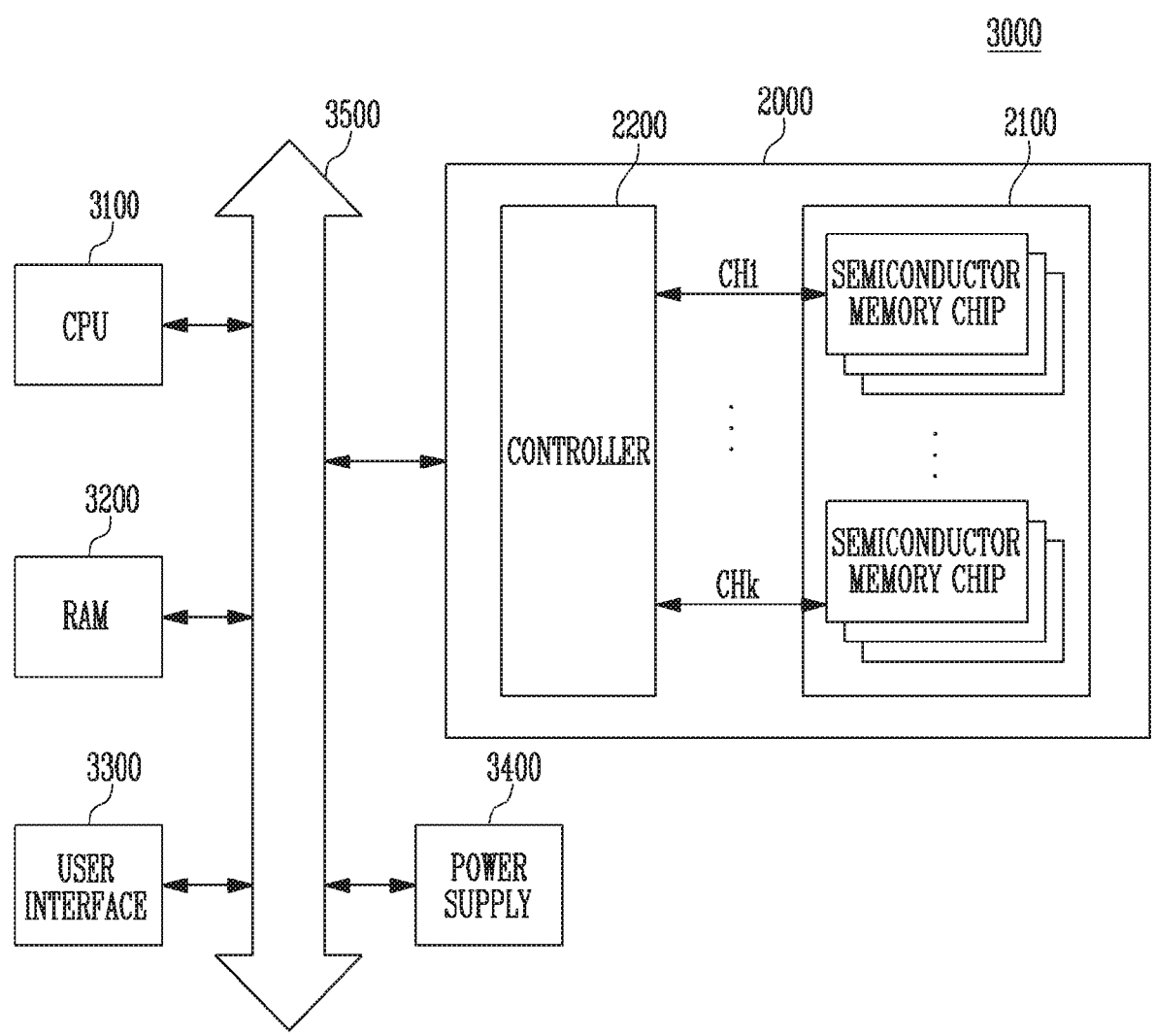
FIG. 18 is a block diagram illustrating a computing system including the memory system illustrated with reference to FIG. 17.

FIG. 18 is a block diagram illustrating a computing system 3000 including the memory system illustrated with reference to FIG. 17.

Referring to FIG. 18, the computing system 3000 may include a central processing unit 3100, a RAM 3200, a user interface 3300, a power supply 3400, a system bus 3500, and a memory system 2000.

The memory system 2000 may be electrically coupled to the CPU 3100, the RAM 3200, the user interface 3300, and the power supply 3400 through the system bus 3500. Data provided through the user interface 3300 or processed by the CPU 3100 may be stored in the memory system 2000.

In FIG. 18, the semiconductor memory device 2100 has been illustrated as being coupled to the system bus 3500 through the controller 2200. Furthermore, the semiconductor memory device 2100 may be directly coupled to the system bus 3500. The function of the controller 2200 may be performed by the CPU 3100 and the RAM 3200.

In FIG. 18, it is illustrated that the memory system 2000 described with reference to FIG. 17 is provided. In an embodiment, the memory system 2000 may be replaced with the memory system 1000 described with reference to FIG. 16. In an embodiment, the computing system 3000 may include both the memory systems 1000 and 2000 described with reference to FIGS. 16 and 17.

Various embodiments of the present disclosure may provide a controller capable of enhancing a read speed of a semiconductor memory device and a method of operating the controller.

Although the embodiments of the present disclosure have been disclosed, those skilled in the art will appreciate that various modifications, additions and substitutions are possible, without departing from the scope and spirit of the present disclosure.

Therefore, the scope of the present disclosure must be defined by the appended claims and equivalents of the claims rather than by the description preceding them.

In the above-described embodiments, in some instances, not all steps or operations need be performed, and steps or operations may combined or performed in a different order than described. The disclosed embodiments are intended to facilitate an understanding of the present invention, not to limit it.

Embodiments of the present invention have been described with reference to the accompanying drawings, and specific terms or words used in the description should be construed in accordance with the spirit of the present invention without limiting the subject matter thereof. It should be understood that many variations and modifications of the basic inventive concept described herein will still fall within the spirit and scope of the present disclosure as defined in the appended claims and their equivalents.

What is claimed is:

1. A controller configured to control an operation of a semiconductor memory device including a plurality of memory blocks, the controller comprising:
    a victim block determiner configured to select a victim block having invalid pages a number of which is greater than a predetermined first reference value among the plurality of memory blocks;
    a sequential data determiner configured to determine whether data stored in valid pages included in the victim block includes sequential data based on a result of comparing a predetermined second reference value and a difference between a maximum address value and a minimum address value of logical block addresses corresponding to the valid pages included in the victim block;
    an associated data determiner configured to determine, when the data stored in the valid pages included in the victim block is determined as including the sequential data, associated data for forming the sequential data together with the data stored in the valid pages included in the victim block, the associated data being stored in a memory block different from the victim block among the plurality of memory blocks; and
    a garbage collection performer configured to control the semiconductor memory device to perform a garbage collection operation for copying the data stored in the valid pages of the victim block and the associated data to a target block.

2. The controller according to claim 1, wherein, when the difference between the maximum address value and the minimum address value is less than the predetermined second reference value, the sequential data determiner determines that the data stored in the valid pages included in the victim block includes the sequential data.

3. The controller according to claim 1, wherein the associated data determiner further searches memory blocks other than the victim block among the plurality of memory blocks for data for forming the sequential data along with the data stored in the valid pages with reference to logical block addresses of the data stored in the valid pages to determine that the searched data is the associated data.

4. The controller according to claim 1, wherein the garbage collection performer generates commands for copying the data stored in the valid pages of the victim block and the associated data to the target block for the garbage collection, and transmits the commands to the semiconductor memory device.

5. The controller according to claim 1,
    further comprising a free block monitor configured to monitor a number of free blocks included in the semiconductor memory device,
    wherein the victim block determiner determines to perform the garbage collection operation on the semiconductor memory device based on the number of free blocks.

6. The controller according to claim 1,
    further comprising a map table storage configured to store a map table for indicating a mapping relationship between logical addresses and physical addresses of data,
    wherein the map table storage transmits physical-to-logical address information for the victim block to the sequential data determiner, and transmits logical-to-physical address information for searching for the associated data to the associated data determiner.

7. A method of operating a controller configured to control a semiconductor memory device including a plurality of memory blocks, the method comprising:
    selecting victim blocks having invalid pages a number of which is greater than a predetermined first reference value among the plurality of memory blocks;
    determining whether data stored in valid pages included in each of the victim blocks includes sequential data based on a result of comparing a predetermined second reference value and a difference between a maximum address value and a minimum address value of logical block addresses corresponding to the valid pages included in the victim block;
    determining, when the data stored in the valid pages included in each of the victim blocks includes the sequential data, associated data, wherein the associated data forms the sequential data together with the data stored in the valid pages included in the selected victim blocks and is stored in a memory block different from the selected victim blocks among the plurality of memory blocks; and
    performing a garbage collection operation for copying the data stored in the valid pages of the victim blocks and the associated data to a target block.

8. The method according to claim 7, wherein the selecting of the victim blocks comprises:
    counting the number of invalid pages included in a selected memory block among the plurality of memory blocks;
    determining whether the number of invalid pages is greater than the predetermined first reference value; and
    determining the selected memory block to be a victim block when the number of invalid pages is greater than the predetermined first reference value.

9. The method according to claim 8, wherein the determining of whether the data stored in the valid pages included in each of the victim blocks includes the sequential data comprises:
    determining the maximum address value and the minimum address value;
    determining whether the difference between the maximum address value and the minimum address value is less than the predetermined second reference value; and
    determining, when the difference between the maximum address value and the minimum address value is less than the predetermined second reference value, that the data stored in the valid pages included in the selected victim block includes the sequential data.

10. The method according to claim 9, wherein the performing of the garbage collection operation comprises:
determining the associated data with reference to a map table when the data of the selected victim block includes the sequential data; and
copying the data stored in the victim block and the associated data to the target block for garbage collection.

11. The method according to claim 10, further comprising, after the copying of the data stored in the victim block and the associated data to the target block for the garbage collection, releasing the victim block as a free block,
and invalidating the associated data stored in the memory block different from the selected victim block.

12. The method according to claim 8, wherein the determining of whether the data stored in the valid pages included in each of the victim blocks includes the sequential data comprises:
counting a number of valid pages included in a selected victim block;
determining whether the number of valid pages is greater than the predetermined second reference value; and
determining the maximum address value and the minimum address value of the logical block addresses corresponding to the valid pages included in the selected victim block when the number of valid pages is greater than the predetermined second reference value;
determining whether the difference between the maximum address value and the minimum address value is less than a predetermined third reference value; and
determining, when the difference between the maximum address value and the minimum address value is less than the predetermined third reference value, that the data stored in the valid pages included in the selected victim block includes the sequential data.

13. The method according to claim 7, further comprising determining to perform garbage collection for the semiconductor memory device.

14. The method according to claim 13, wherein the determining to perform the garbage collection for the semiconductor memory device comprises determining to perform the garbage collection when a number of free blocks of the plurality of memory blocks is less than a predetermined critical value.

* * * * *